United States Patent
Ikeda

(10) Patent No.: US 10,803,589 B2
(45) Date of Patent: Oct. 13, 2020

(54) IMAGE PROCESSING DEVICE

(71) Applicant: OLYMPUS CORPORATION, Hachioji-shi, Tokyo (JP)

(72) Inventor: Hideru Ikeda, Tokyo (JP)

(73) Assignee: OLYMPUS CORPORATION, Tokyo (JP)

(*) Notice: Subject to any disclaimer, the term of this patent is extended or adjusted under 35 U.S.C. 154(b) by 210 days.

(21) Appl. No.: 16/151,590

(22) Filed: Oct. 4, 2018

(65) Prior Publication Data
US 2019/0043202 A1 Feb. 7, 2019

Related U.S. Application Data

(63) Continuation of application No. PCT/JP2016/061694, filed on Apr. 11, 2016.

(51) Int. Cl.
*G06T 7/11* (2017.01)
*G06T 1/20* (2006.01)
(Continued)

(52) U.S. Cl.
CPC .............. *G06T 7/11* (2017.01); *G06F 13/20* (2013.01); *G06K 9/4642* (2013.01); *G06T 1/20* (2013.01); *G06T 1/60* (2013.01)

(58) Field of Classification Search
None
See application file for complete search history.

(56) References Cited

U.S. PATENT DOCUMENTS

| 5,852,742 A | 12/1998 | Vondran, Jr. et al. |
| 6,145,024 A * | 11/2000 | Maezawa ............ G06F 13/122 385/24 |

(Continued)

FOREIGN PATENT DOCUMENTS

| JP | 5-303631 A | 11/1993 |
| JP | H10-334225 A | 12/1998 |

(Continued)

OTHER PUBLICATIONS

Office Action dated Mar. 17, 2020, issued in counterpart JP Application No. 2018-511556, with English Translation. (7 pages).
(Continued)

*Primary Examiner* — Andrae S Allison
(74) *Attorney, Agent, or Firm* — Westerman, Hattori, Daniels & Adrian, LLP

(57) ABSTRACT

The present invention provides an image processing device in which an image processing section for configuring a pipeline by connecting a plurality of processing modules for performing predetermined processing on input image data in series performs image processing for each block obtained by dividing image data of one frame read from a data storage section via a data bus, wherein the image processing section includes an external input/output module incorporated into the pipeline as a processing module configured to perform processing different from processing of each of the processing modules and wherein the external input/output module is configured to directly transmit data from and to an external processing section outside the image processing section without involving the data bus at a position where the external input/output module is incorporated into the pipeline.

11 Claims, 10 Drawing Sheets

(51) Int. Cl.
*G06F 13/20* (2006.01)
*G06K 9/46* (2006.01)
*G06T 1/60* (2006.01)

(56) References Cited

U.S. PATENT DOCUMENTS

| | | | | |
|---|---|---|---|---|
| 6,473,086 | B1* | 10/2002 | Morein | G06T 15/005 |
| | | | | 345/422 |
| 7,743,183 | B2* | 6/2010 | Virdi | H04L 29/06027 |
| | | | | 365/189.05 |
| 7,787,026 | B1* | 8/2010 | Flory | H04N 1/2166 |
| | | | | 348/231.99 |
| 7,885,485 | B2* | 2/2011 | Choi | H04N 21/4316 |
| | | | | 382/298 |
| 9,632,664 | B2* | 4/2017 | Foss | G06T 13/80 |
| 9,891,811 | B2* | 2/2018 | Federighi | G06F 9/451 |
| 10,200,598 | B2* | 2/2019 | Penha | G11B 27/34 |
| 10,241,721 | B2* | 3/2019 | Nakazono | G06F 3/0613 |
| 2003/0007703 | A1* | 1/2003 | Roylance | G06T 1/20 |
| | | | | 382/303 |
| 2005/0248584 | A1* | 11/2005 | Takeo | G06F 13/4027 |
| | | | | 345/603 |
| 2014/0198977 | A1* | 7/2014 | Narasimha | G06T 5/007 |
| | | | | 382/154 |
| 2018/0365796 | A1* | 12/2018 | Nakazono | G06F 9/38 |

FOREIGN PATENT DOCUMENTS

| | | |
|---|---|---|
| JP | 11-179984 A | 7/1999 |
| JP | H11-272627 A | 10/1999 |
| JP | 2008-021249 A | 1/2008 |
| JP | 2009-054001 A | 3/2009 |
| JP | 2010-245961 A | 10/2010 |
| JP | 2012-098883 A | 5/2012 |

OTHER PUBLICATIONS

International Search Report dated Jul. 5, 2016, issued in counterpart International Application No. PCT/JP2016/061694, with English Translation (2 pages).

* cited by examiner

FIG. 2

| R1  | R2  | R3  | R4  | R5  |
|-----|-----|-----|-----|-----|
| R6  | R7  | R8  | R9  | R10 |
| R11 | R12 | R13 | R14 | R15 |
| R16 | R17 | R18 | R19 | R20 |
| R21 | R22 | R23 | R24 | R25 |

IMAGE PROCESSING DEVICE

The present invention relates to an image processing device.

This application is a continuation application based on PCT Patent Application No. PCT/JP 2016/061694, filed Apr. 11, 2016.

TECHNICAL FIELD

Background Art

In an imaging device such as a still-image camera, a moving-image camera, a medical endoscope camera, or an industrial endoscope camera, various image processing is performed by an image processing device such as a mounted system LSI. In many image processing devices mounted in an imaging device, a plurality of processing blocks for performing image processing are connected to an internal data bus. Also, in the image processing device, for example, a frame memory such as a dynamic random access memory (DRAM) is connected to temporarily store image data to be subjected to image processing. The frame memory is connected to the data bus inside the image processing device and is shared by processing blocks connected to the data bus. In such an image processing device, each processing block performs image processing while sequentially reading image data stored in the frame memory and writing the processed image data in the frame memory through, for example, direct memory access (DMA) via a data bus.

Meanwhile, there is also a processing block for performing processing by adopting a pipeline configuration in which a plurality of processing modules are connected in series among processing blocks provided in an image processing device. For example, in an image processing device, an image processing section configured to perform a series of image processing in the imaging device is a processing block configured to perform pipeline processing. In the image processing section having such a configuration, the improvement of processing efficiency of a series of image processing and speeding up of the imaging device are implemented according to a configuration of the pipeline in which a plurality of image processing modules configured to perform image processing are connected in series. At this time, in the image processing section, overload on a bus bandwidth of the data bus at the time of image processing is avoided and the power consumption of the image processing device is also reduced because reading of image data from the frame memory or writing of image data to the frame memory is not performed, i.e., access to the frame memory by each image processing module configured to perform pipeline processing is not performed, except for image processing modules at data input and output sides for image data in the image processing section.

Also, in the image processing device, image data for one frame stored in the frame memory is divided into a plurality of predetermined rectangular regions and each processing block performs image processing on image data for each rectangular region, thereby improving the efficiency of image processing on the entire image data for one frame. At this time, the flow of image data for image processing is continuous within each rectangular region obtained through division, but the flow of image data is not continuous between different rectangular regions. Thus, in the image processing on each rectangular region, when a spatial filtering process is performed, it is necessary to perform image processing on an overlapping region of image data according to a filter size, a so-called "margin region". Even when image processing is performed after dividing the image data for one frame into a plurality of rectangular regions by performing the image processing on the margin region, it is possible to generate an image in which screen data of a boundary part between adjacent rectangular regions of the divided image data is continuous.

For example, it is necessary to perform image processing on image data of a rectangular region of 120 pixels×120 pixels if a result of performing image processing on image data of a rectangular region of 100 pixels×100 pixels is obtained in image processing for performing a spatial filtering process of 20 pixels×20 pixels. Here, a region of ten pixels located at upper, lower, right and left ends of the rectangular region is a margin region required for the spatial filtering process. Although the margin region is a region necessary for generating an image causing no discomfort at the boundary portion between the rectangular regions of the divided image data as described above, image processing on the margin region for the image processing module for performing the spatial filter processing is extra image processing when image processing is performed on each rectangular region. Thus, the necessity of image processing on the margin region indicates that a region to be subjected to image processing by each image processing module is extended, i.e., the number of pixels of image data on which each image processing module performs image processing is large, and becomes a cause that decreases the processing efficiency of a series of image processing and increases overload on the bus bandwidth of the data bus at the time of image processing.

Therefore, technology of an image processing device having a configuration including a margin storage buffer for temporarily storing image data of a margin region used in image processing has been conventionally proposed. For example, Japanese Unexamined Patent Application, First Publication No. 2010-245961 discloses technology of an image processing device including a margin storage buffer in each image processing module provided in an image processing section configured to perform pipeline processing. In the image processing section configured to perform pipeline processing in the image processing device disclosed in Japanese Unexamined Patent Application, First Publication No. 2010-245961, an image processing module on an image data input side also reads image data of a margin region corresponding to a rectangular region to be processed from a frame memory in addition to image data of the rectangular region to be processed and stores the read image data of the margin region in the margin storage buffer when the image data of the rectangular region to be subjected to image processing is first read from the frame memory. Then, in the image processing device disclosed in Japanese Unexamined Patent Application, First Publication No. 2010-245961, the image processing module on the input side performs image processing on image data of a region including the rectangular region to be processed and the margin region together. In the image processing device disclosed in Japanese Unexamined Patent Application, First Publication No. 2010-245961, a configuration in which each image processing module constituting a pipeline also includes a margin storage buffer as in the image processing module on the input side and sequentially performs image processing in a state in which image data of a rectangular region to be processed and image data of a margin region are combined is disclosed.

Here, the image data of the margin region stored in the margin storage buffer by the image processing module on the input side is image data to be used even when the image processing module on the input side performs image processing on the image data of the next rectangular region to be processed, i.e., a part of the image data of the next rectangular region to be processed. Thus, in the image processing device disclosed in Japanese Unexamined Patent Application, First Publication No. 2010-245961, it is possible to read image data of the next rectangular region to be processed from subsequent image data without re-reading previously read image data, i.e., image data stored in the margin storage buffer, when the image processing module on the input side reads the image data of the next rectangular region to be processed from the frame memory. In the image processing device disclosed in Japanese Unexamined Patent Application, First Publication No. 2010-245961, when the image processing module on the input side reads the image data of the next rectangular region to be processed from the frame memory, the image data of the margin region which is a part of the image data of the next rectangular region to be processed is read from the frame memory and stored in the margin storage buffer.

In this manner, in the image processing device disclosed in Japanese Unexamined Patent Application, First Publication No. 2010-245961, when the image processing module on the input side reads the image data of the rectangular region to be processed from the frame memory, the image data of the margin region which is a part of the image data of the next rectangular region to be processed is pre-read and stored in the margin storage buffer. Thereby, in the image processing device disclosed in Japanese Unexamined Patent Application, First Publication No. 2010-245961, when the image processing module on the input side reads the image data of each rectangular region to be processed from the frame memory, it is unnecessary to redundantly read the pixel data of the margin region from the frame memory and it is possible to avoid overload on the bus bandwidth of the data bus at the time of image processing or deterioration of processing efficiency of a series of image processing. That is, in the image processing device disclosed in Japanese Unexamined Patent Application, First Publication No. 2010-245961, when the image processing module on the input side reads the image data of the rectangular region to be processed from the frame memory, overload on the bus bandwidth of the data bus when image processing is performed or deterioration of processing efficiency of a series of image processing is avoided by reducing the number of times pixel data of the margin region is read.

Meanwhile, various models of imaging devices have been developed according to functions to be installed, a processing capability (speed), or a price thereof. Thus, it is desirable for the image processing device to have an image processing function for implementing a function installed in the imaging device. However, from the viewpoint of a development period and costs of an image processing device, developing image processing devices having a necessary image processing function for each model to be developed for an imaging device is not a useful means. Also, a process of developing only an image processing device having many image processing functions and mounting the developed image processing device in common for all imaging devices becomes a cause of hindering low-cost implementation in an imaging device equipped with few functions.

Therefore, a case in which an imaging device equipped with few functions is implemented at low cost by developing an image processing device having the minimum functions required for image processing and installing only this image processing device and a multi-functional imaging device is implemented by externally connecting another image processing device having an image processing function which is not provided in the image processing device when an imaging device equipped with many functions is implemented is conceived. In other words, it is conceivable that a low-cost imaging device could be implemented by mounting only a low-performance image processing device and a high-performance imaging device with high processing capability could be implemented by mounting both a low-performance image processing device and a high-performance image processing device.

However, in the technology disclosed in Japanese Unexamined Patent Application, First Publication No. 2010-245961, a configuration in which an image processing function is extended so that image processing other than existing image processing, i.e., image processing of an external image processing device, is added to (inserted into) the middle of any image processing module constituting the pipeline and pipeline processing is resumed is not disclosed. Thus, in the technology disclosed in Japanese Unexamined Patent Application, First Publication No. 2010-245961, it is not possible to implement a configuration that satisfies the demand for inserting other image processing into any image processing for performing pipeline processing in the imaging device to extend an image processing function.

If a configuration in which a function is extended by inserting other image processing into any image processing to be performed according to pipeline processing in the image processing device to which the technology disclosed in Japanese Unexamined Patent Application, First Publication No. 2010-245961 is applied is considered, a configuration in which data is exchanged through a frame memory may be conceived. In the case of this configuration, processing in the following procedure is required. Here, it is assumed that an image processing device to which the technology disclosed in Japanese Unexamined Patent Application, First Publication No. 2010-245961 is applied is a low-performance image processing device and an image processing device configured to perform other image processing to be inserted is a high-performance image processing device.

(Procedure 1): The image processing section provided in the low-performance image processing device stores image data obtained by performing image processing in the frame memory until the function to be extended is inserted. More specifically, the image processing section provided in the low-performance image processing device reads the image data to be processed from the frame memory connected to the low-performance image processing device via the data bus, and the image processing is performed until other image processing is inserted to extend the function according to pipeline processing, i.e., the image processing is interrupted. The image processing section provided in the low-performance image processing device stores partially processed image data in the frame memory connected to the low-performance image processing device via the data bus.

(Procedure 2): Image data obtained by partially performing image processing is transmitted from the low-performance image processing device to the high-performance image processing device. More specifically, an external interface section provided in the low-performance image processing device reads the image data stored in procedure 1 from the frame memory connected to the low-performance image processing device via the data bus and transmits the read image data to an external interface section provided in the high-performance image processing device. The external interface section provided in the high-performance image processing device stores the image data transmitted from the external interface section provided in the low-performance image processing device in the frame memory connected to the high-performance image processing device.

(Procedure 3): The image processing section provided in the high-performance image processing device re-stores image data obtained by performing image processing of the function to be extended in the frame memory. More specifically, the image processing section provided in the high-performance image processing device reads image data transmitted from the low-performance image processing device and stored in the frame memory connected to the high-performance image processing device and re-stores image data obtained by performing image processing for extending the function in the frame memory connected to the high-performance image processing device.

(Procedure 4): Image data obtained by performing image processing is transmitted from the high-performance image processing device to the low-performance image processing device. More specifically, the external interface section provided in the high-performance image processing device reads the image data stored in procedure 3 from the frame memory connected to the high-performance image processing device and transmits the image data to the external interface section provided in the low-performance image processing device. The external interface section provided in the low-performance image processing device stores image data transmitted from the external interface section provided in the high-performance image processing device in the frame memory connected to the low-performance image processing device via the data bus.

(Procedure 5): The image processing section provided in the low-performance image processing device performs subsequent image processing on image data obtained by performing the image processing of the function to be extended. More specifically, the image processing section provided in the low-performance image processing device reads the image data transmitted from the high-performance image processing device and stored in the frame memory connected to the low-performance image processing device via the data bus and performs subsequent image processing in pipeline processing. The image processing section provided in the low-performance image processing device stores image data obtained by completing all image processing in pipeline processing in the frame memory connected to the low-performance image processing device via the data bus.

In this manner, when a configuration in which a function is extended by inserting other image processing into any image processing of configured pipeline processing is considered in the image processing device to which the technology disclosed in Japanese Unexamined Patent Application, First Publication No. 2010-245961 is applied, the transmission of data to and from the frame memory connected to each image processing device is necessary and the pipeline processing configured in the image processing device is interrupted. Thereby, in the image processing device to which the technology disclosed in Japanese Unexamined Patent Application, First Publication No. 2010-245961 is applied, an effect of avoiding overload on the bus bandwidth of the data bus when image processing is performed by providing a margin storage buffer and avoiding the deterioration of processing efficiency of a series of image processing is reduced.

Therefore, in the image processing device to which the technology disclosed in Japanese Unexamined Patent Application, First Publication No. 2010-245961 is applied, it is difficult to implement a configuration for extending an image processing function by inserting an image processing module for performing other image processing into any image processing module for performing a series of image processing by configuring a pipeline.

SUMMARY OF INVENTION

Solution to Problem

According to a first aspect of the present invention, there is provided an image processing device in which an image processing section including a plurality of processing modules for performing predetermined processing on input image data and a data storage section for store the image data are connected to a data bus, wherein the image processing section is configured as a pipeline by connecting the plurality of processing modules in series, and performing pipeline processing in which each processing module sequentially performs the processing, the image processing section includes an external input/output module incorporated into the pipeline as the processing module configured to perform processing different from the processing to be performed by each of the processing modules, the image processing section performs image processing by dividing a region of the image data of one frame into a plurality of blocks each having a predetermined size and reading the image data included in the block from a data storage section via the data bus for each block, the external input/output module is configured to directly output processed data input by a first processing module to an external processing section outside the image processing section without involving the data bus, and directly output externally processed data input by the external processing section to a second processing module without involving the data bus, the first processing module being the processing module located at a stage previous to a position where the external input/output module is incorporated into the pipeline, the second processing module being the processing module located at a stage subsequent to the first processing module in the pipeline, the processed data being the data obtained by performing the processing on the image data included in the block by the first processing module, the externally processed data being the data performed external processing on the processed data by the external processing section.

According to a second aspect of the present invention, in the image processing device according to the above-described first aspect, the external input/output module may be configured to directly output externally processed data to a second processing module without involving the data bus or perform both a direct output of the processed data to the external processing section without involving the data bus and a direct output of the externally processed data to the second processing module without involving the data bus, the second processing module being the processing module located at a stage subsequent to the position where the external input/output module is incorporated into the pipeline.

According to a third aspect of the present invention, in the image processing device according to the above-described first aspect, the external input/output module may include an output buffer section configured to temporarily store the processed data; and an input buffer section configured to temporarily store the externally processed data, wherein the external input/output module may be configured to temporarily store the processed data output by the first processing module in the output buffer section, and output the processed data stored in the output buffer section in response to a request from the external processing section, and wherein the external input/output module may be configured to temporarily store the externally processed data output by the external processing section in the input buffer section, and output the externally processed data stored in the input buffer section in response to a request from the second processing module.

According to a fourth aspect of the present invention, in the image processing device according to the above-described third aspect, the external input/output module may further includes a processing module input control section configured to control writing of the processed data in the output buffer section on the basis of a storage capacity of the output buffer section; an external output control section configured to control reading of the processed data from the output buffer section on the basis of the amount of the processed data stored in the output buffer section; an external input control section configured to control writing of the externally processed data in the input buffer section on the basis of a storage capacity of the input buffer section; and a processing module output control section configured to control reading of the externally processed data from the input buffer section on the basis of the amount of the externally processed data stored in the input buffer section.

According to a fifth aspect of the present invention, in the image processing device according to the above-described fourth aspect, the processing module input control section may be configured to cause the processed data to be written in the output buffer section for each block for performing the processing in the first processing module, the external output control section may be configured to cause the processed data stored in the output buffer section to be read for each unit for performing the external processing in the external processing section, the external input control section may be configured to cause the externally processed data to be written in the input buffer section for each unit for performing the external processing in the external processing section, and the processing module output control section may be configured to cause the externally processed data stored in the input buffer section to be read for each block for performing the processing in the second processing module.

According to a sixth aspect of the present invention, in the image processing device according to the above-described fifth aspect, the output buffer section may include a margin storage buffer configured to temporarily store the processed data of a margin region where the block to be processed overlaps the block adjacent to a rear side in a direction of advance when the pipeline processing is performed within the processed data output by the first processing module; and an output buffer configured to temporarily store the processed data outside the margin region, wherein the processing module input control section may be configured to cause the processed data outside the margin region to be written in the output buffer and cause the processed data of the margin region to be written in the margin storage buffer for each block for which the first processing module has performed the processing, and the external output control section may be configured to cause the processed data stored in the output buffer to be read after causing the processed data stored in the margin storage buffer to be read in accordance with a request from the external processing section.

According to a seventh aspect of the present invention, in the image processing device according to the above-described sixth aspect, the output buffer section may further include a set value buffer configured to temporarily store a set value when the processing is performed on the image data included in the block, the processing module input control section may be configured to cause a corresponding set value to be written in the set value buffer for each block for which the first processing module has performed the processing, and the external output control section may be configured to cause the set value associated with the processed data read from the margin storage buffer and the output buffer to be read from the set value buffer in response to a request from the external processing section.

According to an eighth aspect of the present invention, in the image processing device according to the above-described seventh aspect, the image processing section may further include a setting section configured to set the set value corresponding to the block, the external output control section may be configured to output a reading completion signal to the setting section, and the setting section may be configured to output the set value associated with the processed data subsequently read from the margin storage buffer and the output buffer in accordance with the reading completion signal, the reading completion signal being indicating that reading from the margin storage buffer and the output buffer of the processed data corresponding to the block and reading from the set value buffer of the set value are completed.

According to a ninth aspect of the present invention, in the image processing device according to the above-described eighth aspect, the set value may be a value differing by each block.

According to a tenth aspect of the present invention, in the image processing device according to the above-described fifth aspect, a storage capacity of the output buffer section and a storage capacity of the input buffer section may be less than a storage capacity for storing all pixel data included in the image data of one frame.

According to an eleventh aspect of the present invention, in the image processing device according to the above-described second aspect, the external input/output module may include an output buffer section configured to temporarily store the processed data; and an input buffer section configured to temporarily store the externally processed data, wherein the external input/output module may be configured to temporarily store the processed data output by the first processing module in the output buffer section, and output the processed data stored in the output buffer section in response to a request from the external processing section, and wherein the external input/output module may be configured to temporarily store the externally processed data output by the external processing section in the input buffer section, and output the externally processed data stored in the input buffer section in response to a request from the second processing module.

BRIEF DESCRIPTION OF DRAWINGS

FIG. 2 is a diagram showing an example of a region of image data when an image processing section within the image processing device according to the first embodiment of the present invention divides the image data to perform image processing.

DESCRIPTION OF EMBODIMENTS

First Embodiment

Figure 1:
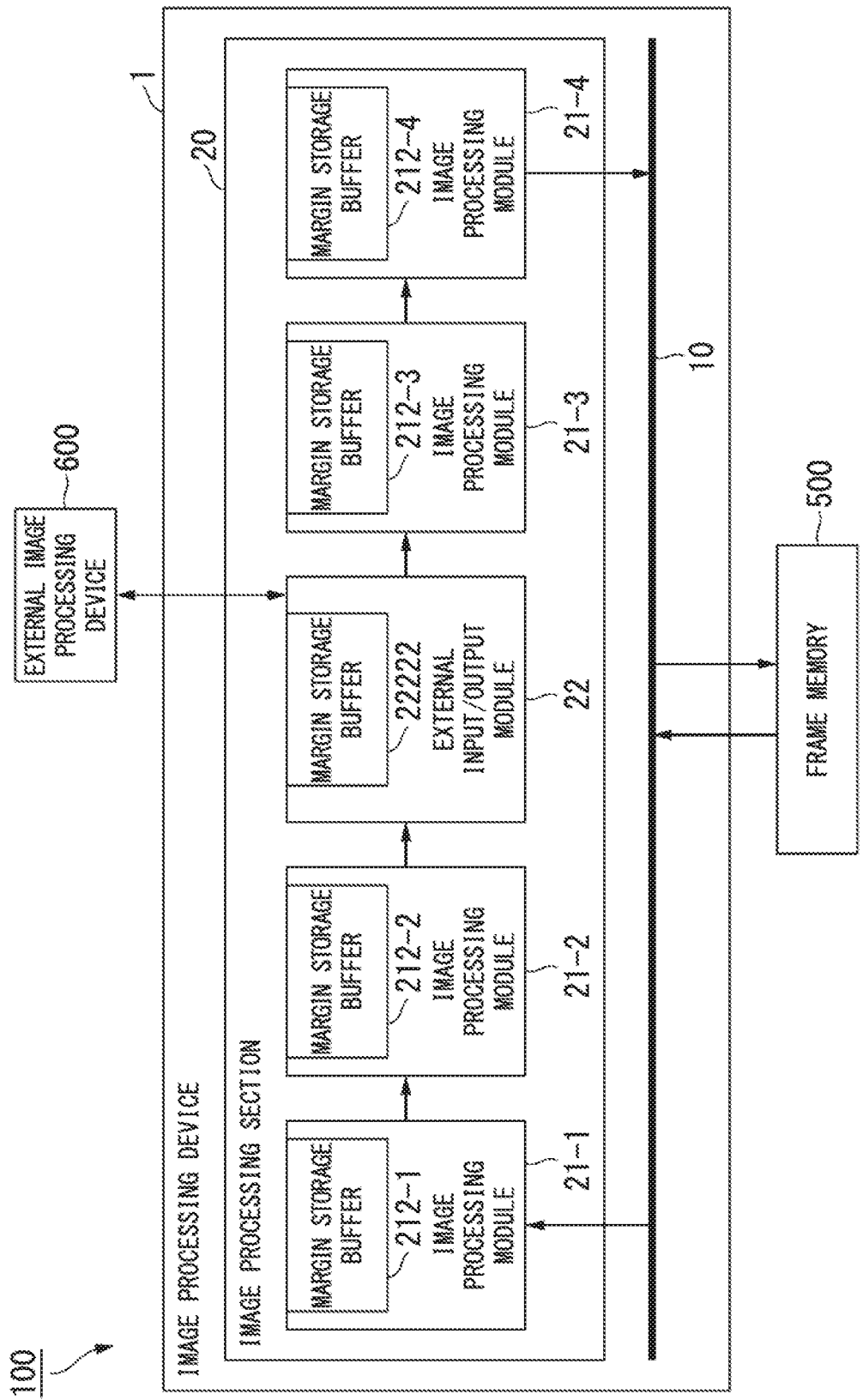
FIG. 1 is a block diagram showing a schematic configuration of an image processing device according to a first embodiment of the present invention.

Hereinafter, embodiments of the present invention will be described with reference to the drawings. In the following description, for example, a case in which an image processing device according to a first embodiment of the present invention is mounted in an imaging device such as a still-image camera (hereinafter referred to as an "imaging device 100") will be described. FIG. 1 is a block diagram showing a schematic configuration of the image processing device according to the first embodiment of the present invention. Also, in FIG. 1, a frame memory 500 and an external image processing device 600 are shown together as components in the imaging device 100 related to the image processing device 1 according to the first embodiment of the present invention.

The image processing device 1 shown in FIG. 1 includes a data bus 10 and an image processing section 20. Also, the image processing section 20 includes four image processing modules 21 (image processing modules 21-1 to 21-4) and an external input/output module 22. Each of the image processing modules 21 includes a margin storage buffer 212 for temporarily storing image data of a margin region. More specifically, the image processing module 21-1 includes a margin storage buffer 212-1, the image processing module 21-2 includes a margin storage buffer 212-2, the image processing module 21-3 includes a margin storage buffer 212-3, and the image processing module 21-4 includes a margin storage buffer 212-4. Also, the external input/output module 22 includes a margin storage buffer 22222 for temporarily storing image data of the margin region.

Also, in FIG. 1, illustration of other components connected to each component provided in the imaging device 100 and the data bus 10 in the image processing device 1 is omitted. Other components provided in the imaging device 100 include, for example, a solid-state imaging device (an image sensor) configured to photoelectrically convert an optical image of a subject formed by a lens, a display device configured to display an image captured by the imaging device 100, and the like. Other components provided in the image processing device 1 include, for example, a control section configured to control the overall operation of the image processing device 1, a pre-processing section configured to perform predetermined signal processing (pre-processing) on a pixel signal output by performing imaging in a solid-state imaging element, and a display processing section configured to perform display processing for causing the display device provided in the imaging device 100 to display data of an image processed by the image processing section 20. Also, other components provided in the image processing device 1 include, for example, a recording processing section configured to perform a recording process of recording the data of the image processed by the image processing section 20 in a recording device provided in the imaging device 100 and the like. Also, for example, there are a system control section configured to control the components provided in the image processing device 1 and the external image processing device 600 and the like as other components included in the imaging device 100.

The frame memory 500 is a data storage section connected to the data bus 10 within the image processing device 1 and configured to store various data processed in the imaging device 100. The frame memory 500 includes, for example, a dynamic random access memory (DRAM) or the like. For example, the frame memory 500 stores pre-processed image data of a still image output from a solid-state imaging device (not shown) by a pre-processing section (not shown) provided in the image processing device 1. The frame memory 500 stores, for example, image data of a still image obtained by the image processing section 20 provided in the image processing device 1 performing predetermined image processing on the image data obtained by the pre-processing section (not shown) performing pre-processing. In this manner, the frame memory 500 stores image data of each processing step in the imaging device 100 or the image processing device 1.

In the image processing device 1, still-image data of one frame stored in the frame memory 500 is divided into a plurality of rectangular regions each having a predetermined size and the image processing section 20 performs image processing for each rectangular region. In the following description, data included in each rectangular region obtained by dividing still-image data of one frame is referred to as "block image data".

The image processing section 20 is a pipeline processing section configured to perform various image processing predetermined in the image processing device 1 on the input block image data. More specifically, the image processing section 20 sequentially performs image processing in the image processing device 1 according to pipeline processing in which the image processing modules 21-1 to 21-4 are connected in series. The image processing section 20 reads data of each pixel (hereinafter referred to as "pixel data") included in the block image data, for example, from the frame memory 500 for every predetermined number of columns and performs image processing by using the read pixel data as one processing unit. In the following description, in terms of pixel data of one processing unit for performing image processing in the image processing section 20, a plurality of pieces of consecutive pixel data included in the same column is referred to as a "unit line".

Also, the image processing section 20 has a function of selecting image processing included in pipeline processing and a function of changing the order of image processing to be performed according to the pipeline processing, i.e., a function of changing the configuration of a pipeline. More specifically, the image processing section 20 can configure a pipeline for sequentially performing image processing of the image processing modules 21-1 to 21-4, but the image processing section 20 can configure a pipeline for performing image processing of one or more of the image processing modules 21-1 to 21-4 and a pipeline for performing image processing by changing the order of the image processing modules 21-1 to 21-4. In the following description, the image processing modules 21-1 to 21-4 are referred to as "image processing modules 21" when they are represented without distinction. Also, for example, the configuration of the pipeline in the image processing section 20 is changed (set) by the system control section (not shown), or the control section (not shown) provided in the image processing device 1. In the following description, the system control section (not shown), and the control section (not shown) provided in the image processing device 1 are simply referred to as "control sections" unless they are distinguished.

Also, the image processing section 20 has a function of incorporating image processing different from image processing executed by each of the image processing modules 21-1 to 21-4 into pipeline processing. Here, the image processing incorporated into the pipeline processing is image processing which is not executed in any image processing module 21 of the image processing modules 21-1 to 21-4, and is image processing to be executed by a component provided outside the image processing section 20 (hereinafter referred to as "external image processing").

In the configuration of the imaging device 100 shown in FIG. 1, the image processing to be executed by the external image processing device 600 provided outside the image processing device 1 can be incorporated into the pipeline processing as external image processing. In the image processing section 20, the external image processing to be executed by the external image processing device 600 is incorporated into the pipeline processing by incorporating the external input/output module 22 serving as an image processing module configured to execute external image processing into the configuration of the pipeline. Also, as described above, the configuration of the pipeline in the image processing section 20 is changed (set) by, for example, the control section (not shown). Accordingly, in the image processing section 20, the setting of whether or not to incorporate the external input/output module 22 into the pipeline, the setting of a position of the external input/output module 22 when the external input/output module 22 is incorporated into the pipeline, and the like are performed by the control section (not shown) together with the setting of the function of changing the configuration of the pipeline described above.

In FIG. 1, external image processing to be executed by the external image processing device 600 is incorporated into the pipeline by incorporating the external input/output module 22 between the image processing module 21-2 and the image processing module 21-3. That is, a state in which a pipeline for sequentially performing image processing of the image processing module 21-1, image processing of the image processing module 21-2, image processing of the external image processing device 600, image processing of the image processing module 21-3, and image processing of the image processing module 21-4 is configured in the image processing section 20 shown in FIG. 1 is shown.

As described above, a position where the external input/output module 22 is incorporated into the pipeline in the image processing section 20 is set by, for example, the control section (not shown). That is, the position where the external input/output module 22 is incorporated into the pipeline is not limited to the position shown in FIG. 1 in the image processing section 20, and external input/output module 22 can be incorporated at any position within the pipeline. In other words, in the image processing section 20, the external input/output module 22 can be incorporated at any position such as a beginning, a middle, or an end of the pipeline. Thus, in the image processing section 20, it is possible to incorporate only the external input/output module 22 into the pipeline, i.e., perform only the external image processing of the external image processing device 600 as pipeline processing.

Also, in the image processing section 20, switching between the output destinations of pixel data output by the image processing modules 21 and the external input/output module 22, i.e., connections of the image processing modules 21 and the external input/output module 22 provided in the image processing section 20, is performed by, for example, a connection switching unit (not shown) provided in the image processing section 20 according to settings of the control section (not shown) in the pipeline processing. The connection switching unit (not shown) also performs switching between connections of control signals and the like exchanged between adjacent image processing modules 21 and the external input/output module 22 in the pipeline configuration. That is, in the image processing section 20, the connection switching unit (not shown) changes the order of image processing to be performed by the image processing section 20 and the position of external image processing to be incorporated into the pipeline.

Each of the image processing modules 21-1 to 21-4 is a processing module configured to perform various predetermined digital image processing on input pixel data. For example, each of the image processing modules 21-1 to 21-4 performs various predetermined digital image processing on pixel data included in the block image data stored in the frame memory 500, pixel data output from another image processing module 21 connected to a previous stage, or pixel data output from the external input/output module 22 connected to a previous stage in accordance with control from the control section (not shown). The image processing performed by each of the image processing modules 21-1 to 21-4 includes various image processing. The image processing to be performed by the image processing module 21 includes, for example, YC processing for generating a Y (luminance) signal and a C (color) signal corresponding to pixel data, a noise reduction process of reducing noise included in pixel data, low pass filter (LPF) processing of suppressing high-frequency components in an image represented by pixel data, an edge enhancement process of enhancing the outline of a subject in an image, and the like. Also, the image processing to be performed by the image processing module 21 includes, for example, a process of calculating a feature value by using pixel information of a certain space as in high pass filter (HPF) processing or a bilateral filtering process. A filter size in each filtering process includes various sizes, for example, such as 3 pixels×3 pixels or 10 pixels×10 pixels.

Each of the image processing modules 21-1 to 21-4 includes a data buffer capable of temporarily storing pixel data of a predetermined number of unit lines. Each of the image processing modules 21-1 to 21-4 temporarily stores pixel data read from the frame memory 500 via the data bus 10 and pixel data output from another image processing module 21 or the external input/output module 22 connected to a previous stage in the margin storage buffer 212 configured as the data buffer or a part of the data buffer, and performs the image processing on the temporarily stored pixel data. Each of the image processing modules 21-1 to 21-4 outputs the pixel data subjected to the image processing to another image processing module 21 connected to the subsequent stage, the external input/output module 22 connected to the subsequent stage, or the frame memory 500.

In the image processing section 20 shown in FIG. 1, the image processing module 21-1 reads pixel data included in block image data stored in the frame memory 500 for each unit line via the data bus 10 and outputs pixel data obtained by performing image processing on the read pixel data to the image processing module 21-2 connected to the subsequent stage. Also, in the image processing section 20 shown in FIG. 1, the image processing module 21-2 outputs pixel data obtained by performing image processing on the pixel data output from the image processing module 21-1 connected to the previous stage to the external input/output module 22 connected to the subsequent stage. In the image processing section 20 shown in FIG. 1, the image processing module 21-3 performs image processing on the pixel data output from the external input/output module 22 connected to the previous stage and outputs the pixel data subjected to the image processing to the image processing module 21-3 connected to the subsequent stage. Also, in the image processing section 20 shown in FIG. 1, the image processing module 21-4 outputs pixel data obtained by performing the image processing on the pixel data output from the image processing module 21-3 connected to the previous stage to the frame memory 500 via the data bus 10 and causes the output pixel data to be written (stored) in the frame memory 500. Also, the reading of pixel data from the frame memory 500 by the image processing module 21 and the writing of image data in the frame memory 500 may be performed in a method based on direct memory access (DMA).

Also, in the following description, pixel data after the image processing module 21 performs image processing is referred to as "processed pixel data" when the pixel data is distinguished from pixel data to be subjected to image processing stored in the frame memory 500.

The external input/output module 22 is an interface module for incorporating external image processing to be executed by a component provided outside the image processing section 20 into pipeline processing. For example, the external input/output module 22 directly outputs the pixel data (processed pixel data) output from the image processing module 21 connected to the previous stage to the connected external image processing device 600 without involving the data bus 10 in accordance with control from the control section (not shown). Also, for example, the external input/output module 22 outputs pixel data obtained by performing external image processing directly input from the connected external image processing device 600 without involving the data bus 10 to the image processing module 21 connected to the subsequent stage in accordance with control from the control section (not shown).

The external input/output module 22 includes a data buffer capable of temporarily storing pixel data of a predetermined number of unit lines. The external input/output module 22 temporarily stores the processed pixel data output from the image processing module 21 connected to the previous stage in the margin storage buffer 22222 configured as the data buffer or a part of the data buffer and directly outputs the temporarily stored processed pixel data to the external image processing device 600 without involving the data bus 10. Also, the external input/output module 22 temporarily stores the pixel data subjected to external image processing directly input from the external image processing device 600 without involving the data bus 10 in the data buffer and outputs the temporarily stored pixel data subjected to the external image processing to the image processing module 21 connected to the subsequent stage as the processed pixel data.

Also, as described above, in the image processing section 20, it is possible to incorporate only the external input/output module 22 into the pipeline, i.e., perform only the external image processing of the external image processing device 600 as the pipeline processing. In this case, the external input/output module 22 temporarily stores pixel data read from the frame memory 500 via the data bus 10 in the margin storage buffer 22222 configured as the data buffer or a part of the data buffer and then directly outputs the temporarily stored pixel data to the external image processing device 600 without involving the data bus 10. Also, the external input/output module 22 temporarily stores the pixel data subjected to the external image processing directly input from the external image processing device 600 without involving the data bus 10 and then outputs the temporarily stored pixel data to the frame memory 500 via the data bus 10 to cause the pixel data to be written (stored) in the frame memory 500. Also, the reading of pixel data from the frame memory 500 by the external input/output module 22 and the writing of image data in the frame memory 500 may also be performed in a method based on DMA.

Also, a detailed description related to a configuration of the external input/output module 22, an operation when the external input/output module 22 incorporates external image processing into the pipeline processing of the image processing section 20, and the like will be given below. In the following description, pixel data after the external image processing is performed is referred to as "externally processed pixel data" when the pixel data is distinguished from pixel data to be subjected to image processing stored in the frame memory 500 or pixel data after any one of the image processing modules 21 performs image processing (processed pixel data). Also, in the following description, when processed pixel data output by each of the image processing modules 21 and externally processed pixel data output by the external input/output module 22 are represented without distinction, they are simply referred to as "processed pixel data".

In this manner, the image processing section 20 divides still-image data of one frame stored in the frame memory 500 into block image data of a plurality of rectangular regions. Then, in the image processing section 20, each image processing module 21 performs, for example, pipeline processing on block image data by sequentially performing image processing according to, for example, control from the control section (not shown), on pixel data included in block image data for each unit line. Thereby, the image processing section 20 performs a series of image processing on the still-image data of one frame stored in the frame memory 500. Also, external image processing which is not executed in any image processing module 21 in the image processing section 20 is executed by, for example, a component provided outside the image processing section 20 (the external image processing device 600 in FIG. 1) and incorporated into the pipeline processing. At this time, the image processing section 20 incorporates the external input/output module 22 serving as an image processing module configured to execute external image processing into the pipeline configuration. Thereby, in the case of image processing that cannot be executed by the image processing section 20 in the image processing device 1, it is also possible to perform processing as in the pipeline processing performed by the image processing section 20. In other words, in the image processing device 1, the pipeline processing in the image processing section 20 can be extended.

Also, in the configuration of the imaging device 100 shown in FIG. 1, a configuration in which the external image processing device 600 is directly connected to the external input/output module 22 within the image processing section 20 provided in the image processing device 1 is shown. Accordingly, the external input/output module 22 is configured to include an external interface section (not shown) for exchanging data with the external image processing device 600. However, the configuration of the external input/output module 22 is not limited to the configuration including the external interface section. For example, the external input/output module 22 may not include an external interface section, and the image processing device 1 and the external image processing device 600 provided outside the image processing device 1 may be connected and the external interface section (not shown) for exchanging data between the image processing section 20 (more specifically, the external input/output module 22) and the external image processing device 600 may be configured to be provided inside the image processing device 1, i.e., outside the image processing section 20. In this case, the external input/output module 22 exchanges (transmits) pixel data (processed pixel data) and externally processed pixel data via the external interface section (not shown) provided within the image processing device 1. That is, an external interface section (not shown) provided within the image processing device 1 directly transmits the pixel data (the processed pixel data) output from the external input/output module 22 to the external image processing device 600 without involving the data bus 10 and directly outputs the externally processed pixel data transmitted from the external image processing device 600 to the external input/output module 22 without involving the data bus 10.

Also, in the present invention, a specification and a scheme of data transmission to the external image processing device 600 in the external interface section (not shown) provided within the external input/output module 22 or the image processing device 1 are not particularly limited. That is, various existing specifications or schemes used for transmitting data between two or more system LSIs can be adopted as a data transmission scheme in the external interface section (not shown). For example, as a scheme of transmitting data to the external image processing device 600 in the external interface section (not shown), schemes according to various predetermined specifications such as an advanced extensible interface (AXI) specification and a high-speed serial bus specification such as a peripheral component interconnect-express (PCI-Express) specification to be used between two or more system LSIs may be adopted. Also, a plurality of specifications or schemes for use in transmitting data between two or more system LSIs may be adopted as the data transmission scheme in the external interface section (not shown) and a data transmission scheme in the external interface section (not shown) may be configured to be changed in accordance with a data transmission specification or scheme adopted in the system LSI (the external image processing device 600 in FIG. 1) connected to the image processing device 1.

Also, the external interface section (not shown) provided within the external input/output module 22 or the image processing device 1 may include a function of matching the format of the pixel data output from the external input/output module 22 with the format of the data to be processed by the external image processing device 600 when data is received and transmitted from and to the external image processing device 600. For example, when the pixel data is transmitted to the external image processing device 600, the external interface section (not shown) may include a function of converting a format of pixel data output from the external input/output module 22 into a format according to a specification during transmission to the external image processing device 600 when the pixel data is transmitted to the external image processing device 600. Also, the external interface section (not shown) may have a function of converting data to be transmitted in a format according to a specification of the external image processing device 600 into a format to be processed by the external input/output module 22, i.e., a format of pixel data on which the image processing module 21 continues to perform image processing, when externally processed pixel data is received from the external image processing device 600.

The external image processing device 600 is an image processing device (system LSI) provided outside the image processing device 1 in the imaging device 100 and configured to perform predetermined digital image processing (external image processing) incorporated into a pipeline configured within the image processing section 20 provided in the image processing device 1. The external image processing device 600 performs various predetermined types of digital image processing which are not executed in any image processing module 21 within the image processing section 20 provided in the image processing device 1, i.e., external image processing for extending image processing to be executed in the image processing device 1, on pixel data output from the external input/output module 22 within the image processing section 20 provided in the image processing device 1. There are various types of image processing as external image processing to be performed by the external image processing device 600. The external image processing to be performed by the external image processing device 600 also includes, for example, an image interpolation process accompanied by the conversion of a position (coordinates) of each pixel included in the block image data, and the like. The image interpolation process includes, for example, various processes such as a resizing process of changing (enlarging or reducing) a size of an image, a distortion correction process of correcting distortion such as magnification chromatic aberration and distortion aberration included in an image, and a shape correction process of performing correction of a shape of an image such as trapezoidal correction. The external image processing device 600 outputs pixel data obtained by performing the external image processing (externally processed pixel data) to the external input/output module 22.

Also, the external image processing device 600 may be configured to perform external image processing according to control from the control section (not shown), for example, on the pixel data output from the external input/output module 22 and output externally processed pixel data obtained by performing external image processing to the external input/output module 22. Also, the external image processing device 600 is connected to the data bus within the external image processing device 600 when external image processing is performed on input pixel data, and may be configured to use a data storage section (not shown), for example, such as a DRAM, configured to temporarily store various data when external image processing is executed in the imaging device 100. Also, the external image processing device 600 may be configured to include the external interface section (not shown).

According to such a configuration, in the imaging device 100, external image processing to be executed by the external image processing device 600 is incorporated into the pipeline processing based on the image processing to be executed by each of the image processing modules 21 within the image processing section 20 provided in the image processing device 1. Thereby, in the imaging device 100, it is also possible to extend image processing as in the pipeline processing performed by the image processing section 20 provided in the image processing device 1 by connecting the external image processing device 600 to the image processing device 1 with respect to image processing which cannot be executed by only the image processing device 1.

Figure 3:
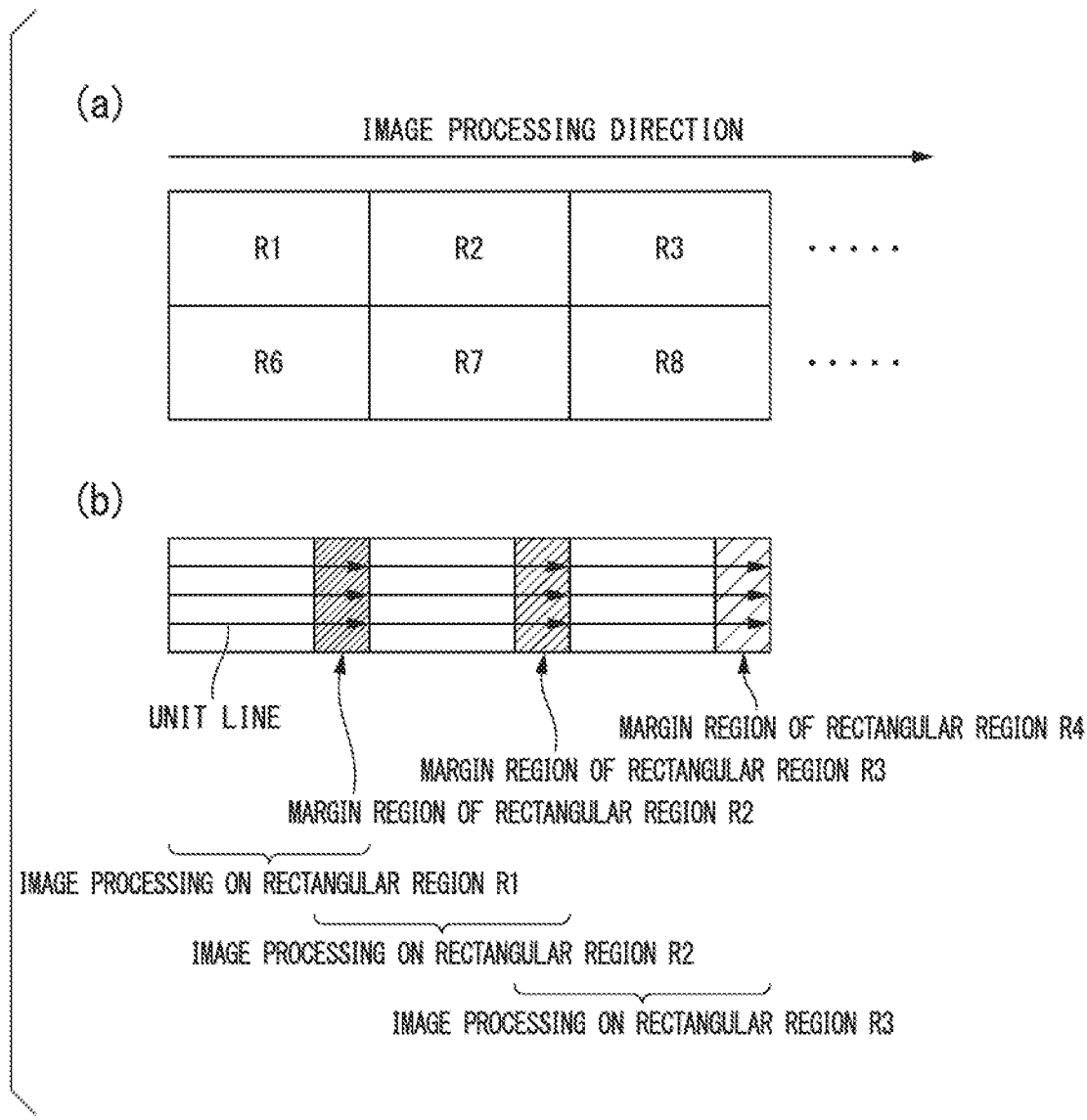
FIG. 3 is a diagram showing an example of a relationship between a processing direction of image processing to be performed after dividing by the image processing section within the image processing device according to the first embodiment of the present invention and a margin region.
Figure 4:
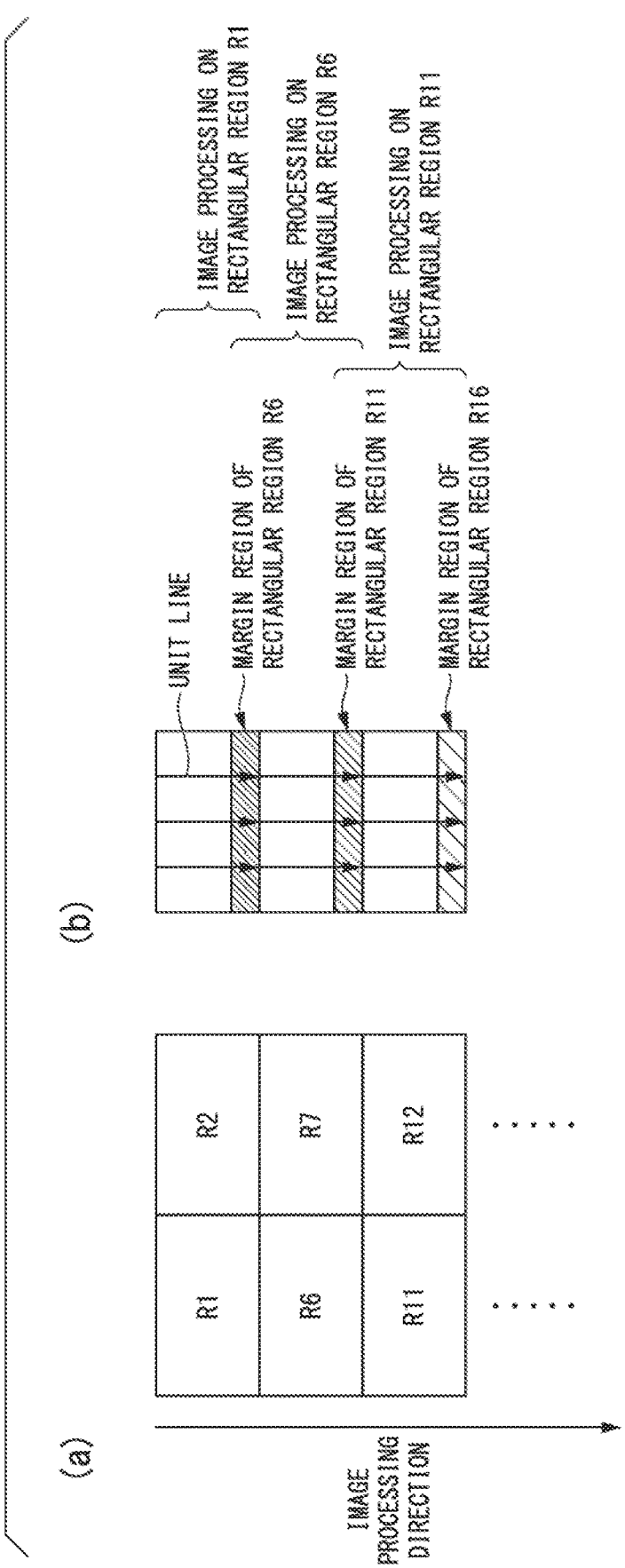
FIG. 4 is a diagram showing an example of a relationship between a processing direction of image processing to be performed after dividing by the image processing section within the image processing device according to the first embodiment of the present invention and a margin region.

Next, an operation of the image processing module 21 provided in the image processing section 20 in the image processing device 1 will be described. FIG. 2 is a diagram showing an example of a region of image data when the image processing section 20 within the image processing device 1 according to the first embodiment of the present invention divides the image data to perform image processing. Also, FIG. 3 and FIG. 4 are diagrams showing examples of a relationship between a processing direction of image processing to be performed after dividing by the image processing section 20 within the image processing device 1 according to the first embodiment of the present invention and a margin region.

As described above, in the image processing device 1, still-image data of one frame stored in the frame memory 500 is divided into a plurality of rectangular regions each having a predetermined size and the image processing section 20 performs image processing on block image data included in a rectangular region for each rectangular region. In FIG. 2, an example when still-image data of one frame is divided into 5 parts in each of a horizontal direction (a row direction or a lateral direction) and a vertical direction (a column direction or a longitudinal direction), i.e., when still-image data of one frame is divided into 25 parts which are 25 rectangular regions R1 to R25, is shown.

In the image processing device 1, each image processing module 21 and the external input/output module 22 provided in the image processing section 20, i.e., the external image processing device 600, perform a series of image processing on still-image data of one frame in pipeline processing by sequentially performing various predetermined types of image processing on block image data included in each rectangular region obtained through division.

Here, an operation in which each image processing module 21 performs pipeline processing on still-image data of one frame divided as shown in FIG. 2 will be described. In the image processing section 20 provided in the image processing device 1, a direction in which each image processing module 21 and the external input/output module 22 perform image processing, i.e., a direction (an order) in which a rectangular region to be subjected to image processing is advanced, is set by the control section (not shown). At this time, the control section (not shown) sets (switches) a direction of advance (an order) of a rectangular region to be subjected to image processing, for example, in accordance with an operation mode of the imaging device 100 or a type of image processing to be executed in the image processing device 1, so that the image processing on the still-image data of one frame is more quickly completed.

For example, if an image corresponding to still-image data of one frame stored in the frame memory 500 is displayed on the display device provided in the imaging device 100, a direction in which the display device displays an image is the horizontal direction (the row direction or the lateral direction). In this case, the control section (not shown) performs setting so that each image processing module 21 and the external input/output module 22 perform pipeline processing while advancing a rectangular region to be subjected to a display process in the horizontal direction (the row direction or the lateral direction) or a so-called raster order so that pipeline processing corresponding to the display process is quickly completed.

Also, for example, if an image according to still-image data of one frame stored in the frame memory 500 is recorded in a recording device such as a memory card attached to the imaging device 100, for example, a recording process such as still-image processing such as JPEG processing or moving-image processing such as MPEG processing or H.264 processing is performed in units of 8×8 pixels. In this case, the control section (not shown) performs setting so that each image processing module 21 and the external input/output module 22 perform pipeline processing while advancing a rectangular region to be subjected to a recording process in the vertical direction (the column direction or the longitudinal direction) so that pipeline processing corresponding to the recording process is quickly completed. Thereby, each image processing module 21 and the external input/output module 22 perform image processing on the block image data included in each rectangular region in the direction (the order) set by the control section (not shown).

In the following, a relationship between a direction (an order) in which a rectangular region to be subjected to image processing is advanced and a margin region will be described by paying attention to an operation of one image processing module 21 (more specifically, the image processing module 21-1) constituting the pipeline. First, the relationship between the direction (the order) and the margin region when a rectangular region to be subjected to image processing is advanced in the horizontal direction (the row direction or the lateral direction) will be described with reference to FIG. 3. In FIG. 3, an example when the image processing module 21-1 performs image processing while advancing the rectangular region to be processed in the horizontal direction (the row direction or the lateral direction) is schematically shown. If image processing is performed while the rectangular region is advanced in the horizontal direction (the row direction or the lateral direction), a rectangular region to be subjected to image processing of the image processing module 21-1 moves in the horizontal direction (the row direction or the lateral direction) as in the order of a rectangular region R1, a rectangular region R2, a rectangular region R3, . . . , a rectangular region R6, . . . as shown in (a) of FIG. 3.

First, the image processing module 21-1 reads pixel data included in the block image data corresponding to the rectangular region R1 from the frame memory 500 for each unit line. At this time, in the image processing module 21-1, pixel data located in the margin region of the rectangular region R2 within the read pixel data of each unit line of the rectangular region R1 is stored in the margin storage buffer 212-1. Thereby, the pixel data of each unit line included in the margin region overlapping the rectangular region R1 used when image processing is performed on the rectangular region R2 is pre-stored in the margin storage buffer 212-1. Then, the image processing module 21-1 outputs processed pixel data obtained by performing image processing on the read pixel data of the rectangular region R1 to the image processing module 21-2.

Thereafter, the image processing module 21-1 reads pixel data included in the block image data corresponding to the rectangular region R2 from the frame memory 500 for each unit line in continuation with pixel data stored in the margin storage buffer 212-1 when image processing is subsequently performed on pixel data included in the block image data corresponding to the rectangular region R2. At this time, in the image processing module 21-1, pixel data located in the margin region of the rectangular region R3 within the read pixel data of each unit line of the rectangular region R2 is stored in the margin storage buffer 212-1. Thereby, the pixel data of each unit line included in the margin region overlapping the rectangular region R2 used when image processing is performed on the rectangular region R3 is pre-stored in the margin storage buffer 212-1. The image processing module 21-1 performs image processing on the pixel data of the rectangular region R2 in a state in which the pixel data stored in the margin storage buffer 212-1 and the pixel data of the read rectangular region R2 are combined and outputs processed pixel data after image processing to the image processing module 21-2.

Thereafter, the image processing module 21-1 reads pixel data included in the block image data corresponding to the rectangular region R3 from the frame memory 500 for each unit line in continuation with pixel data stored in the margin storage buffer 212-1 similarly even when image processing is subsequently performed on pixel data included in the block image data corresponding to the rectangular region R3. At this time, in the image processing module 21-1, similarly, the pixel data located in the margin region of the rectangular region R4 within the pixel data of each unit line of the read rectangular region R3 is stored in the margin storage buffer 212-1. Likewise, in a state in which the pixel data stored in the margin storage buffer 212-1 and the read pixel data of the rectangular region R3 are combined, the image processing module 21-1 outputs processed pixel data obtained by performing image processing on the pixel data of the rectangular region R3 to the image processing module 21-2.

In this manner, the image processing module 21-1 advances a rectangular region to be processed in the horizontal direction (the row direction or the lateral direction) while storing pixel data located in a margin region for the next rectangular region (here, a region of a right end of each rectangular region) in the margin storage buffer 212-1 and sequentially outputs processed pixel data obtained by performing image processing on the entire still-image data of one frame to the image processing module 21-2. The operations of the image processing modules 21-2 to 21-4 and the external input/output module 22 are also similar to the above-described operation of the image processing module 21-1, except that pixel data to be subjected to image processing becomes processed pixel data output by the image processing module 21 of the previous stage or the external input/output module 22. Thereby, in the image processing section 20, the image processing module 21 and the external input/output module 22, i.e., the external image processing device 600, perform pipeline processing for sequentially performing image processing on the block image data included in each rectangular region.

Also, each of the image processing module 21 and the external input/output module 22 (the external image processing device 600) can perform image processing on different rectangular regions in parallel in the same period. For example, in the image processing section 20 shown in FIG. 1, image processing on the rectangular region R1 in the image processing module 21-4, image processing on the rectangular region R2 in the image processing module 21-3, image processing on the rectangular region R3 in the external input/output module 22 (the external image processing device 600), image processing on the rectangular region R4 in the image processing module 21-2, and image processing on the rectangular region R5 in the image processing module 21-1 can be performed in parallel.

Also, each image processing module 21 can also perform image processing on the same rectangular region. For example, in the image processing section 20 shown in FIG. 1, image processing on the rectangular region R2 in the image processing module 21-4 and the image processing module 21-3, image processing on the rectangular region R3 in the external input/output module 22 (the external image processing device 600), and image processing on the rectangular region R4 in the image processing module 21-2 and the image processing module 21-1 can be performed in parallel.

Also, the external input/output module 22 (the external image processing device 600) can perform image processing on different rectangular regions in the same period. For example, in the image processing section 20 shown in FIG. 1, image processing on the rectangular region R1 in the image processing module 21-4, image processing on the rectangular region R2 in the image processing module 21-3, image processing on the rectangular region R3 and the rectangular region R4 in the external input/output module 22 (the external image processing device 600), image processing on the rectangular region R5 in the image processing module 21-2, and image processing on the rectangular region R6 in the image processing module 21-1 can be performed in parallel.

Next, the relationship between the direction (the order) and the margin region when a rectangular region to be subjected to image processing is advanced in the vertical direction (the column direction or the vertical direction) will be described with reference to FIG. 4. In FIG. 4, an example when the image processing module 21-1 performs image processing while advancing a rectangular region to be processed in the vertical direction (the column direction or the vertical direction) is schematically shown. If image processing is performed while the rectangular region is advanced in the vertical direction (the column direction or the vertical direction), a rectangular region to be subjected to image processing of the image processing module 21-1 moves in the vertical direction (the column direction or the vertical direction) as in the order of a rectangular region R1, a rectangular region R6, a rectangular region R11, . . . , a rectangular region R2, . . . as shown in (a) of FIG. 4.

First, the image processing module 21-1 reads pixel data included in the block image data corresponding to the rectangular region R1 from the frame memory 500 for each unit line. At this time, in the image processing module 21-1, pixel data located in the margin region of the rectangular region R6 within the read pixel data of each unit line of the rectangular region R1 is stored in the margin storage buffer 212-1. Thereby, the pixel data of each unit line included in the margin region overlapping the rectangular region R1 used when image processing is performed on the rectangular region R6 is pre-stored in the margin storage buffer 212-1. Then, the image processing module 21-1 outputs processed pixel data obtained by performing image processing on the read pixel data of the rectangular region R1 to the image processing module 21-2.

Thereafter, the image processing module 21-1 reads pixel data included in the block image data corresponding to the rectangular region R6 from the frame memory 500 for each unit line in continuation with pixel data stored in the margin storage buffer 212-1 when image processing is subsequently performed on pixel data included in the block image data corresponding to the rectangular region R6. At this time, in the image processing module 21-1, pixel data located in the margin region of the rectangular region R11 within the read pixel data of each unit line of the rectangular region R6 is stored in the margin storage buffer 212-1. Thereby, the pixel data of each unit line included in the margin region overlapping the rectangular region R6 used when image processing is performed on the rectangular region R11 is pre-stored in the margin storage buffer 212-1. The image processing module 21-1 performs image processing on the pixel data of the rectangular region R6 in a state in which the pixel data stored in the margin storage buffer 212-1 and the pixel data of the read rectangular region R6 are combined and outputs processed pixel data after image processing to the image processing module 21-2.

Thereafter, the image processing module 21-1 reads pixel data included in the block image data corresponding to the rectangular region R11 from the frame memory 500 for each unit line in continuation with pixel data stored in the margin storage buffer 212-1 similarly even when image processing is subsequently performed on pixel data included in the block image data corresponding to the rectangular region R11. At this time, in the image processing module 21-1, similarly, the pixel data located in the margin region of the rectangular region R16 within the pixel data of each unit line of the read rectangular region R11 is stored in the margin storage buffer 212-1. Likewise, in a state in which the pixel data stored in the margin storage buffer 212-1 and the read pixel data of the rectangular region R11 are combined, the image processing module 21-1 outputs processed pixel data obtained by performing image processing on the pixel data of the rectangular region R11 to the image processing module 21-2.

In this manner, the image processing module 21-1 advances a rectangular region to be processed in the vertical direction (the column direction or the vertical direction) while storing pixel data located in a margin region for the next rectangular region (here, a region of a lower end of each rectangular region) in the margin storage buffer 212-1 and sequentially outputs processed pixel data obtained by performing image processing on the entire still-image data of one frame to the image processing module 21-2. Also, the operations of the image processing modules 21-2 to 21-4 and the external input/output module 22 are also similar to the above-described operation of the image processing module 21-1, except that pixel data to be subjected to image processing becomes processed pixel data output by the image processing module 21 of the previous stage or the external input/output module 22. Thereby, in the image processing section 20, the image processing module 21 and the external input/output module 22, i.e., the external image processing device 600, perform pipeline processing for sequentially performing image processing on the block image data included in each rectangular region.

Also, each of the image processing module 21 and the external input/output module 22 (the external image processing device 600) can perform image processing on different rectangular regions in parallel in the same period as in a case in which a rectangular region to be subjected to image processing is advanced in the horizontal direction (the row direction or the lateral direction). For example, in the image processing section 20 shown in FIG. 1, image processing on the rectangular region R1 in the image processing module 21-4, image processing on the rectangular region R6 in the image processing module 21-3, image processing on the rectangular region R11 in the external input/output module 22 (the external image processing device 600), image processing on the rectangular region R16 in the image processing module 21-2, and image processing on the rectangular region R21 in the image processing module 21-1 can be performed in parallel.

Also, each image processing module 21 can also perform image processing on the same rectangular region as in a case in which a rectangular region to be subjected to image processing is advanced in the horizontal direction (the row direction or the lateral direction). For example, in the image processing section 20 shown in FIG. 1, image processing on the rectangular region R16 in the image processing module 21-4 and the image processing module 21-3, image processing on the rectangular region R11 in the external input/output module 22 (the external image processing device 600), and image processing on the rectangular region R6 in the image processing module 21-2 and the image processing module 21-1 can be performed in parallel.

Also, the external input/output module 22 (the external image processing device 600) can perform image processing on different rectangular regions in the same period as in a case in which a rectangular region to be subjected to image processing is advanced in the horizontal direction (the row direction or the lateral direction). For example, in the image processing section 20 shown in FIG. 1, image processing on the rectangular region R1 in the image processing module 21-4, image processing on the rectangular region R6 in the image processing module 21-3, image processing on the rectangular region R11 and the rectangular region R16 in the external input/output module 22 (the external image processing device 600), image processing on the rectangular region R21 in the image processing module 21-2, and image processing on the rectangular region R2 in the image processing module 21-1 can be performed in parallel.

Next, the configuration and operation of the external input/output module 22 provided in the image processing section 20 in the image processing device 1 will be described. Also, although the external input/output module 22 can be incorporated at any position in the pipeline as described above, the external input/output module 22 is described as being incorporated at a position between two image processing modules 21, i.e., the image processing module 21 is described as being connected to each of a stage previous to the external input/output module 22 and a stage subsequent to the external input/output module 22, as in the image processing section 20 shown in FIG. 1 in the following description.

First, a concept of an operation in which pixel data is received and transmitted from and to the external image processing device 600 in the external input/output module 22 provided in the image processing section 20 will be described. As described above, the processed pixel data for performing the external image processing in the image processing section 20 is directly output to the external image processing device 600 by the external input/output module 22 without involving the data bus 10. Also, as described above, in the image processing section 20, each image processing module 21 performs image processing using a plurality of unit lines as one processing unit. Thus, the pixel data to be subjected to the external image processing in the image processing section 20 is also input to the external input/output module 22 for each processing unit and externally processed pixel data obtained by performing the external image processing is also output from the external input/output module 22 for each processing unit. In other words, in the image processing section 20, the exchange of pixel data between the external input/output module 22 and the image processing module 21 connected to a stage previous to the external input/output module 22 and a stage subsequent to the external input/output module 22 is also performed for each processing unit. However, as in each image processing module 21 provided in the image processing section 20, the external image processing device 600 connected to the image processing device 1 does not necessarily perform external image processing for each processing unit. Thus, the external input/output module 22 receives the pixel data output from the image processing module 21 connected to the previous stage for each processing unit and outputs the received pixel data to the external image processing device 600 for each processing unit for performing external image processing. Also, the external input/output module 22 receives the externally processed pixel data output from the external image processing device 600 for each processing unit of the external image processing and outputs the received externally processed pixel data to the image processing module 21 connected to the subsequent stage for each processing unit for performing image processing of each image processing module 21.

Figure 5:
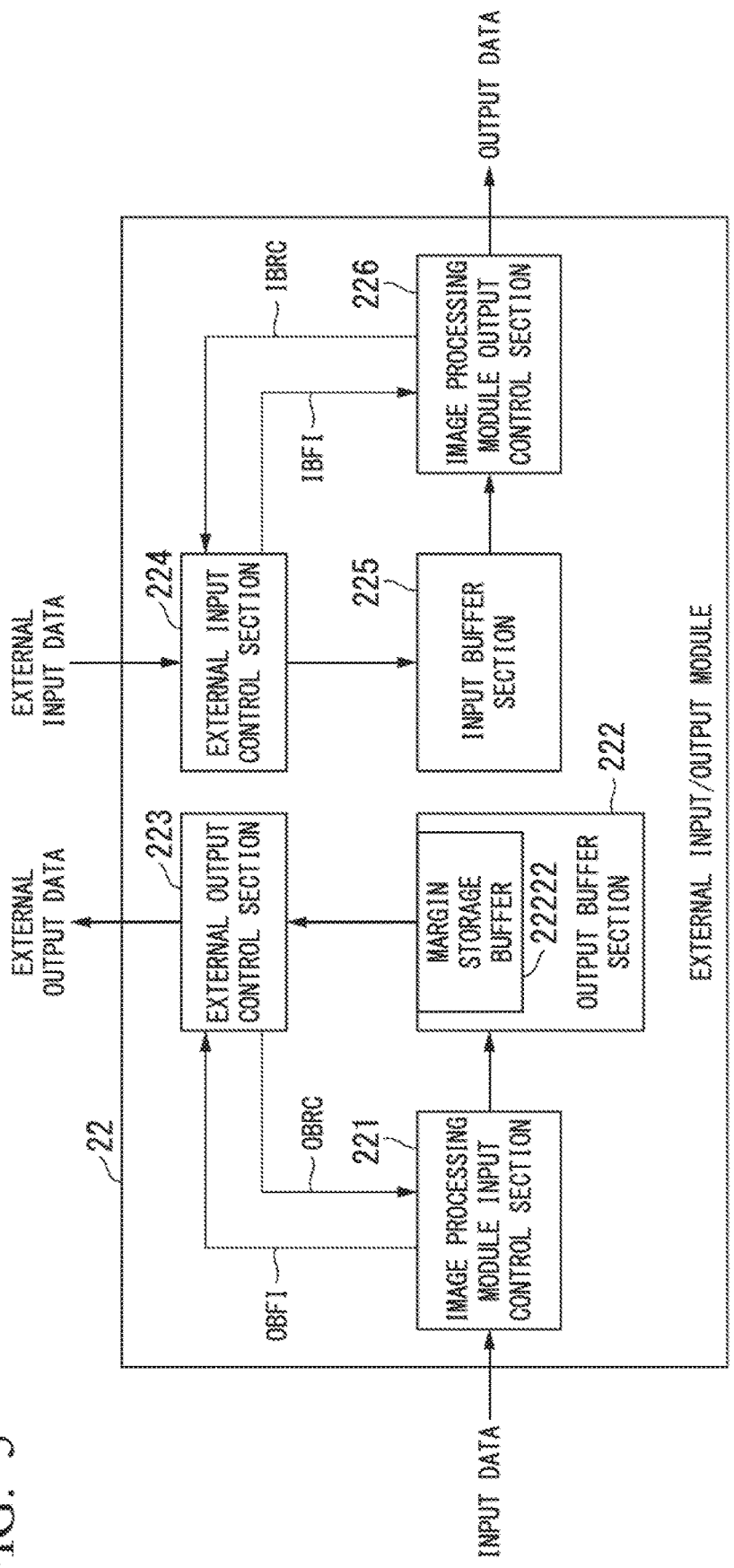
FIG. 5 is a block diagram showing a schematic configuration of an external input/output module provided in the image processing section within the image processing device according to the first embodiment of the present invention.

FIG. 5 is a block diagram showing a schematic configuration of the external input/output module 22 provided in the image processing section 20 within the image processing device 1 according to the first embodiment of the present invention. In FIG. 5, a basic configuration illustrating the conceptual operation of the external input/output module 22 is shown. As shown in FIG. 5, the external input/output module 22 includes an image processing module input control section 221, an output buffer section 222, an external output control section 223, an external input control section 224, an input buffer section 225, and an image processing module output control section 226.

The image processing module input control section 221 performs control for causing the output buffer section 222 to temporarily store input data (processed pixel data) output from the image processing module 21 connected to a stage previous to the external input/output module 22, i.e., processed pixel data to be output to the external image processing device 600. At this time, the control for storing the processed pixel data in the output buffer section 222 in the image processing module input control section 221 is performed on the basis of information of output buffer flag information OBFI and an output buffer reading completion signal OBRC exchanged with the external output control section 223. The output buffer flag information OBFI is flag information indicating the state of storage of processed pixel data in the output buffer section 222, and includes three states of a writing state, a buffer full state, and a buffer empty state. The writing state indicates that the output buffer section 222 is storing (writing) the processed pixel data. The buffer full state indicates that a capacity with which the processed pixel data can be stored is not free in the storage capacity of the output buffer section 222. The buffer empty state indicates that there is a free capacity with which processed pixel data can be stored in the storage capacity of the output buffer section 222. Also, the output buffer reading completion signal OBRC is a signal indicating that the external output control section 223 has completed the reading of the processed pixel data stored in the output buffer section 222.

The output buffer section 222 is a data buffer section configured to temporarily store input data (processed pixel data) input to the external input/output module 22. The output buffer section 222 includes, for example, a memory such as a static random access memory (SRAM). The output buffer section 222 has a storage capacity with which processed pixel data for a predetermined number of unit lines output from the image processing module 21 connected to a stage previous to the external input/output module 22 can be temporarily stored. The output buffer section 222 temporarily stores input data (processed pixel data) which has been input in accordance with control from the image processing module input control section 221. The storage capacity of the output buffer section 222 includes a storage capacity corresponding to the margin storage buffer 22222. The output buffer section 222 temporarily stores the processed pixel data of each unit line included in the margin region within the input data (processed pixel data) which has been input in the storage capacity corresponding to the margin storage buffer 22222.

Also, even if the storage capacity corresponding to the margin storage buffer 22222 is a configuration in which a predetermined storage capacity within the storage capacity of the output buffer section 222 is allocated, the storage capacity may be configured in a memory different from a memory for temporarily storing processed pixel data other than a margin region in the output buffer section 222. That is, the output buffer section 222 may have a configuration in which the storage region of one memory is divided into a plurality of storage regions for use or may be configured to include a plurality of memories corresponding to processed pixel data to be stored. However, when the external image processing device 600 performs a spatial filtering process, it is desirable for the storage capacity of the margin storage buffer 22222 to be a storage capacity with which processed pixel data of a size (a width) of the margin region required in accordance with the filter size can be stored. The storage capacity of the margin storage buffer 22222 may be a configuration in which the storage capacity with which processed pixel data can be stored can be changed in accordance with a size (a width) of the margin region.

Also, in accordance with the control from the external output control section 223, the output buffer section 222 outputs the stored processed pixel data serving as external output data to the external image processing device 600. At this time, in the output buffer section 222, processed pixel data is output to the external image processing device 600 in a state in which the processed pixel data other than the margin region and the processed pixel data of the margin region temporarily stored in the storage capacity corresponding to the margin storage buffer 22222 are combined. Also, a concept for storing (storing) and outputting (reading) the processed pixel data in the output buffer section 222 is similar to the concept of the operation of storing and outputting processed pixel data in the image processing module 21.

The external output control section 223 performs control for reading the input data (processed pixel data) stored in the output buffer section 222 and outputting the read data to the connected external image processing device 600. At this time, the control for reading the processed pixel data stored in the output buffer section 222 in the external output control section 223 is performed on the basis of the information of the output buffer flag information OBFI and the output buffer reading completion signal OBRC exchanged with the image processing module input control section 221.

The external input control section 224 performs control for causing the input buffer section 225 to temporarily store external input data (externally processed pixel data) output from the connected external image processing device 600. At this time, the control for storing the externally processed pixel data in the input buffer section 225 in the external input control section 224 is performed on the basis of information of input buffer flag information IBFI and an input buffer reading completion signal IBRC exchanged with the image processing module output control section 226. The input buffer flag information IBFI is flag information indicating the state of storage of externally processed pixel data in the input buffer section 225, and includes three states of a writing state, a buffer full state, and a buffer empty state as in the output buffer flag information OBFI. The writing state indicates that the input buffer section 225 is storing (writing) the processed pixel data. The buffer full state indicates that a capacity with which the externally processed pixel data can be stored is not free in the storage capacity of the input buffer section 225. The buffer empty state indicates that there is a free capacity with which externally processed pixel data can be stored in the storage capacity of the input buffer section 225. Also, similar to the output buffer reading completion signal OBRC, the input buffer reading completion signal IBRC is a signal indicating that image processing module output control section 226 has completed the reading of the externally processed pixel data stored in the input buffer section 225.

The input buffer section 225 is a data buffer configured to temporarily store external input data (externally processed pixel data) input to the external input/output module 22. Similar to the output buffer section 222, the input buffer section 225 also includes, for example, a memory such as an SRAM. The input buffer section 225 has a storage capacity with which externally processed pixel data for a predetermined number of unit lines output from the external image processing device 600 can be stored as output data. The input buffer section 225 temporarily stores input data (externally processed pixel data) which has been input in accordance with the control from the external input control section 224. Also, the input buffer section 225 stores the stored externally processed pixel data as output data to the image processing module 21 connected to a stage subsequent to the external input/output module 22 in accordance with the control from the image processing module output control section 226.

The image processing module output control section 226 performs control for reading the external input data (externally processed pixel data) stored in the input buffer section 225 and causing the image processing module 21 connected to the stage subsequent to the external input/output module 22 to output the read data. At this time, the control for reading the externally processed pixel data stored in the input buffer section 225 in the image processing module output control section 226 is performed on the basis of the information of the input buffer flag information IBFI and the input buffer reading completion signal IBRC exchanged with the external input control section 224.

According to such a configuration, the external input/output module 22 controls a timing at which the processed pixel data is received and transmitted between the external image processing device 600 connected to the image processing device 1 and the image processing modules 21 connected to the previous stage and the subsequent stage. In other words, the external input/output module 22 controls a timing at which the processed pixel data is received and transmitted between the external image processing device 600 and the image processing module 21 as if the external image processing device 600 is the image processing module 21 provided within the image processing section 20.

Also, in the external image processing device 600, the number of pieces of input data (pixel data), i.e., the number of unit lines, necessary for performing the external image processing differs according to details of the external image processing to be executed by the external image processing device 600. Thus, it is desirable that storage capacities of the output buffer section 222 and the input buffer section 225 be storage capacities capable of satisfying at least the amount required for the external image processing device 600 to perform external image processing, i.e., a unit of external image processing in the external image processing device 600, and storing a number of pieces of pixel data or externally processed pixel data on which the pipeline processing in the image processing section 20 is smoothly performed. For example, it is desirable that the storage capacities of the output buffer section 222 and the input buffer section 225 be predetermined to be storage capacities for performing the pipeline processing normally on the basis of details of the assumed external image processing, a delay time until the externally processed image data is output to the image processing module 21 assumed to be connected to the subsequent stage after processed pixel data is output from the image processing module 21 assumed to be connected to the previous stage, or the like. Also, the storage capacity of the output buffer section 222 or the input buffer section 225 may be determined to be a storage capacity with a predetermined margin.

Figure 6:
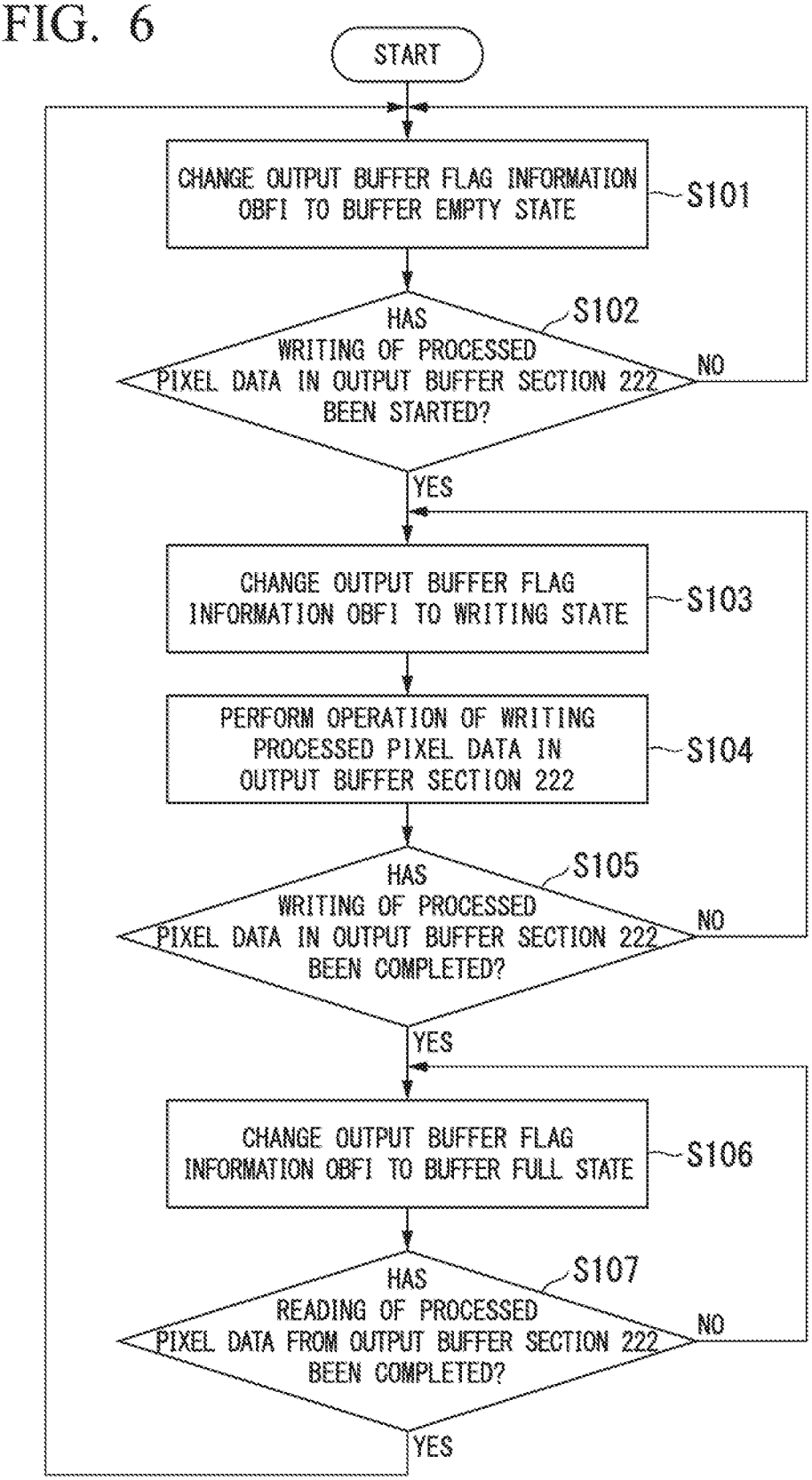
FIG. 6 is a flowchart showing a schematic operation of an image processing module input control section in the external input/output module provided in the image processing section within the image processing device according to the first embodiment of the present invention.
Figure 7:
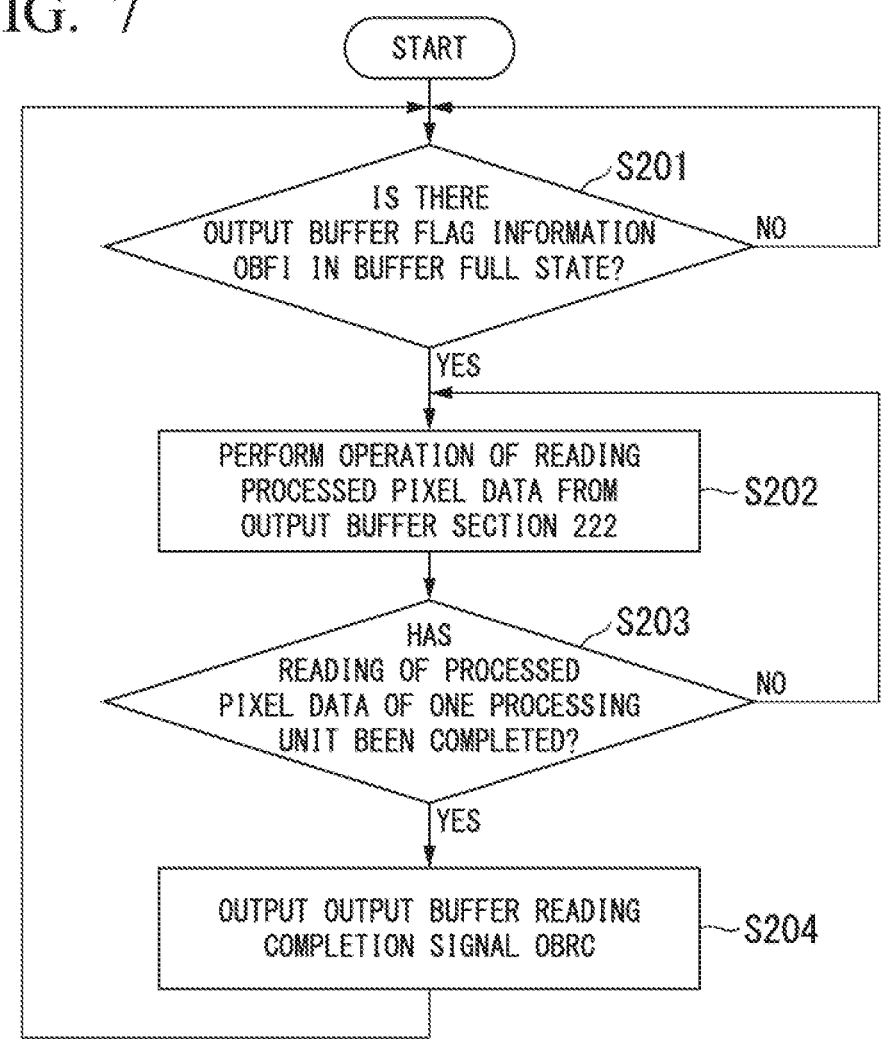
FIG. 7 is a flowchart showing a schematic operation of an external output control section in the external input/output module provided in the image processing section within the image processing device according to the first embodiment of the present invention.

Here, a schematic operation of the external input/output module 22 will be described. FIG. 6 is a flowchart showing a schematic operation of the image processing module input control section 221 in the external input/output module 22 provided in the image processing section 20 within the image processing device 1 according to the first embodiment of the present invention. Also, FIG. 7 is a flowchart showing a schematic operation of the external output control section 223 in the external input/output module 22 provided in the image processing section 20 within the image processing device 1 according to the first embodiment of the present invention.

First, a schematic operation of the image processing module input control section 221 provided in the external input/output module 22 will be described with reference to FIG. 6. When the external input/output module 22 starts the operation, the image processing module input control section 221 first changes the output buffer flag information OBFI to the buffer empty state (step S101).

Subsequently, the image processing module input control section 221 determines whether or not processed pixel data has been output from the image processing module 21 connected to the previous stage and writing of processed pixel data in the output buffer section 222 has been started (step S102).

If a result of the determination in step S102 indicates that the writing of the processed pixel data in the output buffer section 222 has not been started ("NO" in step S102), the image processing module input control section 221 returns to step S101 to continue the buffer empty state of the output buffer flag information OBFI and iterates a determination of whether or not to start the writing of the processed pixel data in the output buffer section 222. In other words, the image processing module input control section 221 waits for the processed pixel data to be output from the image processing module 21 connected to the previous stage.

On the other hand, if a result of the determination in step S102 indicates that the writing of the processed pixel data in the output buffer section 222 has been started ("YES" in step S102), the image processing module input control section 221 changes the output buffer flag information OBFI to the writing state (step S103).

Subsequently, the image processing module input control section 221 performs control for temporarily storing the processed pixel data output from the image processing module 21 connected to the previous stage in the output buffer section 222, i.e., causes an operation of writing the processed pixel data in the output buffer section 222 to be performed (step S104).

Subsequently, the image processing module input control section 221 determines whether or not the writing of the processed pixel data output from the image processing module 21 connected to the previous stage in the output buffer section 222 has been completed (step S105).

If a result of the determination in step S105 indicates that the writing of the processed pixel data in the output buffer section 222 has not been completed ("NO" in step S105), the image processing module input control section 221 returns to step S103 to continue the writing state of the output buffer flag information OBFI and iterate the operation of writing the processed pixel data in the output buffer section 222.

On the other hand, if a result of the determination in step S105 indicates the writing of the processed pixel data in the output buffer section 222 has been completed ("YES" in step S105), the image processing module input control section 221 sets the output buffer flag information OBFI to the buffer full State (step S106).

Subsequently, the image processing module input control section 221 determines whether or not the reading of the processed pixel data (written) stored in the output buffer section 222 by the external output control section 223 has been completed, i.e., whether or not the processed pixel data has been output to the external image processing device 600 (step S107). Also, whether or not reading of the processed pixel data in step S107 has been completed can be determined by checking whether or not the output buffer reading completion signal OBRC has been input from the external output control section 223.

If a result of the determination in step S107 indicates that the reading of the processed pixel data (written) stored in the output buffer section 222 has not been completed ("NO" in step S107), the image processing module input control section 221 returns to step S106 to continue the buffer full state of the output buffer flag information OBFI and iterates the determination of whether or not the reading of the processed pixel data from the output buffer section 222 has been completed. That is, the image processing module input control section 221 waits for the output of the processed pixel data to the external image processing device 600 to be completed.

On the other hand, if a result of the determination in step S107 indicates that the reading of the processed pixel data (written) stored in the output buffer section 222 has been completed ("YES" in step S107), the image processing module input control section 221 returns to step S101 to iterate similar processing on the next processed pixel data output from the image processing module 21 connected to the previous stage.

Subsequently, a schematic operation of the external output control section 223 provided in the external input/output module 22 will be described with reference to FIG. 7. When the external input/output module 22 starts the operation, the external output control section 223 first checks whether or not the output buffer flag information OBFI output from the image processing module input control section 221 is in the buffer full state (step S201).

If a result of the checking in step S201 indicates that the output buffer flag information OBFI is not in the buffer full state ("NO" in step S201), the external output control section 223 returns to step S201 to iterate the checking of the buffer full state of the output buffer flag information OBFI. That is, the external output control section 223 waits for the processed pixel data output from the image processing module 21 connected to the previous stage to be stored (written) in the output buffer section 222.

On the other hand, if a result of the checking in step S201 indicates that the output buffer flag information OBFI is in the buffer full state ("YES" in step S201), the external output control section 223 performs control for causing processed pixel data from the output buffer section 222 to be output, i.e., causes an operation of reading the processed pixel data from the output buffer section 222 to be performed (step S202). Thereby, the output of processed pixel data from the external input/output module 22 to the external image processing device 600 is started.

Subsequently, the external output control section 223 determines whether reading of the processed pixel data from the output buffer section 222, i.e., output of processed pixel data to the external image processing device 600, has been completed (step S203).

If a result of the determination in step S203 indicates that the reading of the processed pixel data from the output buffer section 222 has not been completed ("NO" in step S203), the external output control section 223 returns to step S202 to iterate an operation of reading the processed pixel data from the output buffer section 222.

On the other hand, if a result of the determination in step S203 indicates that the reading of the processed pixel data from the output buffer section 222 has been completed ("YES" in step S203), the external output control section 223 outputs an output buffer reading completion signal OBRC to the image processing module input control section 221 (step S204). Then, the external output control section 223 returns to step S101 to check whether or not the output buffer flag information OBFI is in the buffer full state, i.e., iterate similar processing on the processed pixel data subsequently output to the external image processing device 600.

Through such processing, the image processing module input control section 221 and the external output control section 223 output processed pixel data output from the image processing module 21 connected to the previous stage to the external image processing device 600 while providing a notification of the state of the processed pixel data stored in the output buffer section 222, i.e., while cooperating with each other.

Also, the schematic operation of each of the external input control section 224 and the image processing module output control section 226 provided in the external input/output module 22 can be considered to be similar to the schematic operation of each of the image processing module input control section 221 and the external output control section 223. More specifically, the schematic operation in the external input control section 224 can be considered to be similar to the schematic operation of the image processing module input control section 221 and the schematic operation in the image processing module output control section 226 can be considered to be similar to the schematic operation of the external output control section 223. More specifically, for the schematic operation of the external input control section 224, the image processing module 21 connected to the previous stage, the processed pixel data, and the output buffer section 222 in the schematic operation of the image processing module input control section 221 are replaced with the external image processing device 600, the externally processed pixel data, and the input buffer section 225, respectively. Also, for the schematic operation of the image processing module output control section 226, the external image processing device 600, the processed pixel data, and the output buffer section 222 in the schematic operation of the external output control section 223 are replaced with the image processing module 21 connected to the subsequent stage, the externally processed pixel data, and the input buffer section 225, respectively. For the schematic operation of each of the external input control section 224 and the image processing module output control section 226, the output buffer flag information OBFI and the output buffer reading completion signal OBRC in the schematic operation of each of the image processing module input control section 221 and the external output control section 223 are replaced with the input buffer flag information IBFI and the input buffer reading completion signal IBRC, respectively. According to these replacements, the schematic operation of each of the external input control section 224 and the image processing module output control section 226 can be considered to be similar to the schematic operation of each of the image processing module input control section 221 and the external output control section 223. Accordingly, a detailed description related to the schematic operation of each of the external input control section 224 and the image processing module output control section 226 will be omitted.

Figure 8:
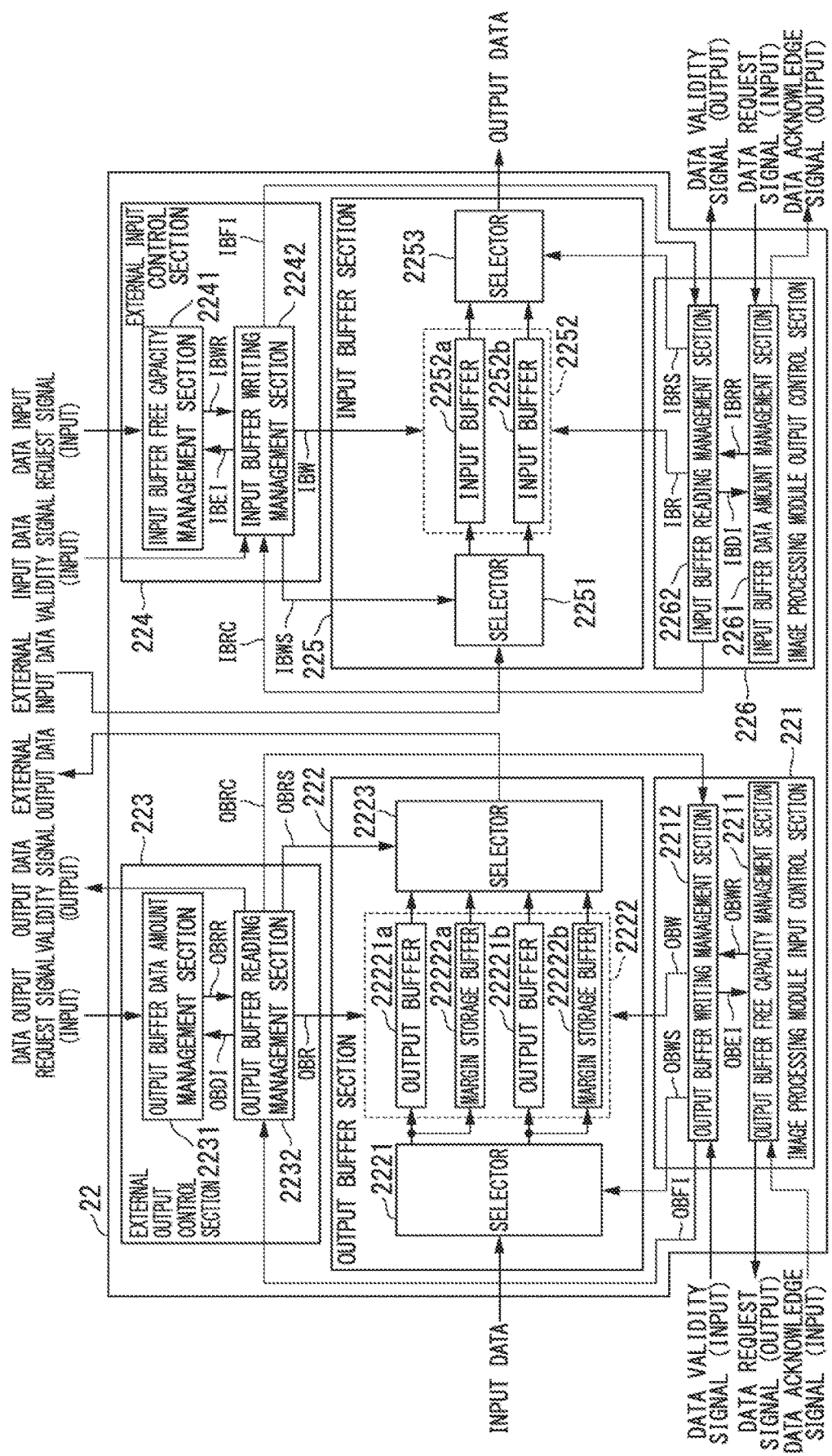
FIG. 8 is a block diagram showing a configuration of the external input/output module provided in the image processing section within the image processing device according to the first embodiment of the present invention.

Next, a more detailed configuration and operation of the external input/output module 22 provided in the image processing section 20 in the image processing device 1 will be described. FIG. 8 is a block diagram showing a configuration of the external input/output module 22 provided in the image processing section 20 within the image processing device 1 according to the first embodiment of the present invention. In FIG. 8, a basic configuration of the external input/output module 22 is shown. The external input/output module 22 shown in FIG. 8 includes an image processing module input control section 221, an output buffer section 222, an external output control section 223, an external input control section 224, an input buffer section 225, and an image processing module output control section 226 as in the configuration showing the conceptual operation shown in FIG. 5.

In the external input/output module 22, input data (processed pixel data) output from the image processing module 21 connected to the previous stage is temporarily stored in the output buffer section 222 according to the configuration of the image processing module input control section 221, the output buffer section 222, and the external output control section 223 and the processed pixel data temporarily stored in the output buffer section 222 is output as external output data in response to a data output request from the connected external image processing device 600. Also, in the external input/output module 22, external input data (externally processed pixel data) output from the external image processing device 600 is temporarily stored in the input buffer section 225 according to the configuration of the external input control section 224, the input buffer section 225, and the image processing module output control section 226 and the externally processed pixel data temporarily stored in the input buffer section 225 is output as output data in response to a data output request from the image processing module 21 connected to the subsequent stage. In the following description, the configuration of the image processing module input control section 221, the output buffer section 222, and the external output control section 223 are referred to as an "external output section" and the configuration of the external input control section 224, the input buffer section 225, and the image processing module output control section 226 is referred to as an "external input section".

First, the external output section in the external input/output module 22 will be described.

As described above, the output buffer section 222 is a data buffer configured to temporarily store input data (processed pixel data) input to the external input/output module 22. The output buffer section 222 shown in FIG. 8 includes a selector 2221, a data buffer section 2222, and a selector 2223. Also, the data buffer section 2222 includes two sets of data buffers including a set of data buffers including an output buffer 22221a and a margin storage buffer 22222a and a set of data buffers including an output buffer 22221b and a margin storage buffer 22222b. The data buffer section 2222 has a so-called double buffer configuration in which an operation is performed so that the writing and reading of the processed pixel data of one processing unit can be performed in the same period by alternately performing switching between the storage (writing) and output (reading) of the processed pixel data in opposite operations in each set of data buffers.

The selector 2221 is a selection section configured to select a set of data buffers in which processed pixel data is written in the output buffer section 222. In accordance with an output buffer writing selection signal OBWS output from the image processing module input control section 221, the selector 2221 selects either a set of data buffers including the output buffer 22221a and the margin storage buffer 22222a or a set of data buffers including the output buffer 22221b and the margin storage buffer 22222b as a set of data buffers in which processed pixel data is written. In the following description, the output buffer 22221a and the margin storage buffer 22222a in a set of data buffers including the output buffer 22221a and the margin storage buffer 22222a are referred to as a "data buffer set a" when they are represented without distinction. Also, the output buffer 22221b and the margin storage buffer 22222b in a set of data buffers including the output buffer 22221b and the margin storage buffer 22222b are referred to as a "data buffer set b" when they are represented without distinction. Then, the selector 2221 outputs input data (processed pixel data) input to the external input/output module 22 to one set of data buffers of the selected data buffer set a or b.

The selector 2223 is a selection section configured to select a set of data buffers from which the processed pixel data stored in the output buffer section 222 is read. In accordance with the output buffer reading selection signal OBRS output from the external output control section 223, the selector 2223 selects either the data buffer set a or the data buffer set b as a set of data buffers from which the stored processed pixel data is read. Then the selector 2223 outputs the processed pixel data read from the selected data buffer set a or b as external output data to the external image processing device 600. Thereby, external output data (processed pixel data) is input to the external image processing device 600.

Each of the data buffer set a and the data buffer set b is a data buffer with a storage capacity for temporarily storing processed pixel data for a predetermined number of unit lines. A set of data buffers of either the data buffer set a or the data buffer set b selected as the data buffer in which the processed pixel data is written by the selector 2221 writes (stores) input data (processed pixel data) input via the selector 2221 in accordance with an output buffer writing signal OBW output from the image processing module input control section 221. At this time, in the selected set of data buffers, processed pixel data other than the margin region is written (stored) in the output buffer 22221, and the processed pixel data of the margin region is written (stored) in the margin storage buffer 22222. On the other hand, a set of data buffers of either the data buffer set a or the data buffer set b selected as a set of data buffers for reading processed pixel data stored by the selector 2223 is output as the stored processed pixel data to the selector 2223 in accordance with the output buffer reading signal OBR output from the external output control section 223. At this time, in the selected set of data buffers, the processed pixel data of the margin region is read (output) from the margin storage buffer 22222 and the processed pixel data other than that of the margin region is read (output) from the output buffer 22221.

As described above, the image processing module input control section 221 controls the storage (writing) of input data (processed pixel data) output from the image processing module 21 connected to a stage previous to the external input/output module 22 in the output buffer section 222. The image processing module input control section 221 shown in FIG. 8 includes an output buffer free capacity management section 2211 and an output buffer writing management section 2212.

The output buffer free capacity management section 2211 determines a free storage capacity in each of the data buffer set a and the data buffer set b provided in the output buffer section 222 on the basis of an output buffer empty information OBEI output from the output buffer writing management section 2212 and outputs a state notification signal indicating an operation state of the external input/output module 22 to the image processing module 21 connected to the previous stage on the basis of a result of determining the free storage capacity. Also, the output buffer free capacity management section 2211 outputs an output buffer writing reservation signal OBWR for making a reservation for storing (writing) input data (processed pixel data) in the set of data buffers having a free storage capacity to the output buffer writing management section 2212 on the basis of a result of determining the free storage capacity.

More specifically, the output buffer free capacity management section 2211 determines whether or not there is a free storage capacity for writing (temporarily storing) input data (processed pixel data) output from the image processing module 21 connected to the previous stage in the data buffer section 2222 on the basis of information about a free capacity of the data buffer set a and the data buffer set b indicated by the output buffer empty information OBEI output from the output buffer writing management section 2212. At this time, the output buffer free capacity management section 2211 determines whether or not there is a free storage capacity in another set of data buffers different from a set of data buffers storing processed pixel data which is not read by the external output control section 223 on the basis of the output buffer empty information OBEI.

Then, if a result of determining the free storage capacity indicates that there is a free storage capacity in a set of data buffers different from a set of data buffers already storing processed pixel data to be read by the external output control section 223, the output buffer free capacity management section 2211 determines that the set of data buffers is in a state in which input data (processed pixel data) output from the image processing module 21 connected to the previous stage can be written. In this case, the output buffer free capacity management section 2211 outputs a data request signal for requesting the output of input data (processed pixel data) as a state notification signal indicating that the input data can be received to the image processing module 21 connected to the previous stage. When a data acknowledge signal indicating that input data (processed pixel data) is output from the image processing module 21 connected to the previous stage is input in response to the output data request signal, the output buffer free capacity management section 2211 outputs an output buffer writing reservation signal OBWR for making a reservation for receiving and writing (temporarily storing) the input data (processed pixel data) corresponding to the data acknowledge signal to the output buffer writing management section 2212. Also, the output buffer writing reservation signal OBWR output from the output buffer free capacity management section 2211 includes information of a set of data buffers for making a reservation for writing (temporarily storing) input data (processed pixel data).

On the other hand, if a result of determining the free storage capacity indicates that there is no free storage capacity in the set of data buffers, the output buffer free capacity management section 2211 determines that it is not possible to write the input data (the processed pixel data) output from the image processing module 21 in any set of data buffers. In this case, the output buffer free capacity management section 2211 outputs a data request signal indicating that the output of input data (processed pixel data) is not requested as a state notification signal indicating a state in which the input data cannot be received to the image processing module 21 connected to the previous stage. Also, the output buffer free capacity management section 2211 may indicate that the output of input data (processed pixel data) is not requested by a signal different from the data request signal.

The output buffer writing management section 2212 monitors a free storage capacity in each of the data buffer set a and the data buffer set b provided in the output buffer section 222 and outputs an output buffer empty information OBEI indicating a result of monitoring a free storage capacity to the output buffer free capacity management section 2211.

More specifically, the output buffer writing management section 2212 monitors a free storage capacity in each of the output buffer 22221a, the margin storage buffer 22222a, the output buffer 22221b, and the margin storage buffer 22222b provided in the output buffer section 222. Then, the output buffer writing management section 2212 outputs information indicating a free storage capacity as the output buffer empty information OBEI to the output buffer free capacity management section 2211 for each monitored data buffer.

Also, the output buffer writing management section 2212 outputs a control signal for controlling writing of input data (processed pixel data) on the basis of the output buffer writing reservation signal OBWR output from the output buffer free capacity management section 2211 to the output buffer section 222.

More specifically, the output buffer writing management section 2212 outputs an output buffer writing selection signal OBWS for selecting a set of data buffers for writing (temporarily storing) the input data (processed pixel data) output from the image processing module 21 connected to the previous stage to the selector 2221 provided in the output buffer section 222 on the basis of information of the set of data buffers included in the output buffer writing reservation signal OBWR output from the output buffer free capacity management section 2211. In accordance with the output buffer writing reservation signal OBWR, the output buffer writing management section 2212 outputs the output buffer writing signal OBW indicating a timing at which input data (processed pixel data) output from the image processing module 21 connected to the previous stage is written to the selected set of data buffers within the output buffer section 222. At this time, the output buffer writing management section 2212 determines whether or not currently input data is valid processed pixel data on the basis of a data validity signal indicating whether or not the processed pixel data included in the unit line output together with the input data (the processed pixel data) from the image processing module 21 connected to the previous stage is valid processed pixel data. Then, the output buffer writing management section 2212 outputs the output buffer writing signal OBW of a timing at which only valid input data (processed pixel data) is written to the set of data buffers included in the output buffer writing reservation signal OBWR. Thereby, in the output buffer section 222, only valid input data (processed pixel data) is written (temporarily stored) in a reserved set of data buffers.

Also, the output buffer writing management section 2212 writes processed pixel data other than that of the margin region within the valid input data (processed pixel data) in the output buffer 22221*a* or the output buffer 22221*b* and outputs an output buffer writing signal OBW of a timing at which processed pixel data of the margin region overlapping a rear rectangular region is written in the margin storage buffer 22222*a* or the margin storage buffer 22222*b* to the set of data buffers included in the output buffer writing reservation signal OBWR. In switching of a writing destination of the input data (the processed pixel data) by the output buffer writing management section 2212, for example, the writing destination of the next input data (processed pixel data) is switched to the margin storage buffer 22222*a* or the margin storage buffer 22222*b* after the amount of valid input data (processed pixel data) is measured and a predetermined amount of input data (processed pixel data) is written in the output buffer 22221*a* or the output buffer 22221*b*.

Also, the output buffer writing management section 2212 outputs the output buffer flag information OBFI based on information of the output buffer empty information OBEI, the output buffer writing reservation signal OBWR output from the output buffer free capacity management section 2211, and the output buffer read completion signal OBRC output from the external output control section 223 to the external output control section 223.

More specifically, if the output buffer empty information OBEI indicates that there is a free storage capacity in both or either of the data buffer set a and the data buffer set b, the output buffer writing management section 2212 outputs the output buffer flag information OBFI indicating the buffer empty state to the external output control section 223. Also, if the output buffer writing reservation signal OBWR indicating that a reservation for storing (writing) input data (processed pixel data) has been made is input from the output buffer free capacity management section 2211, the output buffer writing management section 2212 outputs the output buffer flag information OBFI indicating the writing state to the external output control section 223. Also, when the writing of valid input data (processed pixel data) to the output buffer section 222 is completed according to the output buffer writing signal OBW, the output buffer writing management section 2212 outputs the output buffer flag information OBFI indicating the buffer full state to the external output control section 223. When the output buffer reading completion signal OBRC is input from the external output control section 223, the output buffer writing management section 2212 outputs the output buffer flag information OBFI indicating the buffer empty state to the external output control section 223. Also, the output buffer flag information OBFI may be information including a plurality of pieces of information corresponding to the output buffer 22221*a*, the margin storage buffer 22222*a*, the output buffer 22221*b*, and the margin storage buffer 22222*b* provided in the output buffer section 222.

As described above, the external output control section 223 controls the output (reading) of the input data (the processed pixel data) stored in the output buffer section 222. The external output control section 223 shown in FIG. 8 includes an output buffer data amount management section 2231 and an output buffer reading management section 2232.

The output buffer data amount management section 2231 determines the amount of input data (processed pixel data) stored in each of the data buffer set a and the data buffer set b provided in the output buffer section 222 on the basis of output buffer data amount information OBDI output from the output buffer reading management section 2232. Then, the output buffer data amount management section 2231 outputs an output buffer reading reservation signal OBRR for making a reservation for outputting (reading) the input data (the processed pixel data) from the data buffer set to the output buffer reading management section 2232 in response to the data output request from the external image processing device 600.

More specifically, the output buffer data amount management section 2231 determines whether or not the input data (the processed pixel data) to be output to the external image processing device 600 is written (temporarily stored) in the data buffer section 2222 on the basis of the amount of data stored in the data buffer set a and the data buffer set b indicated by the output buffer data amount information OBDI output from the output buffer reading management section 2232. At this time, the output buffer data amount management section 2231 determines whether or not there is input data (processed pixel data) of which writing has been completed in another set of data buffers different from a set of data buffers in which the input data (processed pixel data) is written by the image processing module input control section 221 on the basis of the output buffer data amount information OBDI.

If as a result of determining the amount of processed pixel data indicates that the processed pixel data to be output as external output data to the external image processing device 600 has already been stored in the set of data buffers, the output buffer data amount management section 2231 determines that the set of data buffers is in a state in which the processed pixel data can be read and output to the external image processing device 600. In this case, when a data output request signal for requesting the output of external output data (processed pixel data) from the external image processing device 600 is input, the output buffer data amount management section 2231 outputs the output buffer reading reservation signal OBRR for making a reservation for reading (outputting) external output data (processed pixel data) corresponding to the data output request signal to the output buffer reading management section 2232.

Also, the output buffer reading reservation signal OBRR output by the output buffer data amount management section 2231 includes information of a set of data buffers for which it is determined that writing of processed pixel data is completed, i.e., information of a set of data buffers from which the processed pixel data is read. Also, the output buffer reading reservation signal OBRR includes the amount of external output data (processed pixel data) requested from the external image processing device 600, i.e., the amount of input data (processed pixel data) read and output from the data buffer section 2222. Also, the output buffer data amount management section 2231 may output a data output reception signal indicating that output of external output data (processed pixel data) based on the data output request signal has been received to the external image processing device 600.

On the other hand, if a result of determining the amount of processed pixel data indicates that the processed pixel data to be output as the external output data is not stored in the set of data buffers, the output buffer data amount management section 2231 determines that the processed pixel data cannot be read from any set of data buffers. In this case, the output buffer data amount management section 2231 may output a data output reception signal indicating a state in which it is not possible to receive the output of the external output data (the processed pixel data) based on the data output request signal to the external image processing device 600. Also, at this time, the data output reception signal may indicate that the output of the external output data (processed pixel data) cannot be received by a logic level of the data output reception signal or a signal different from the data output reception signal.

On the basis of the output buffer flag information OBFI output from the image processing module input control section 221, the output buffer reading management section 2232 monitors the amount of input data (processed pixel data) written in each of the data buffer set a and the data buffer set b provided in the output buffer section 222 and outputs the output buffer data amount information OBDI indicating the result of monitoring the amount of data to the output buffer data amount management section 2231.

More specifically, the output buffer reading management section 2232 monitors the amount of data written in each of the output buffer 22221*a*, the margin storage buffer 22222*a*, the output buffer 22221*b*, and the margin storage buffer 22222*b* provided in the output buffer section 222. Then, the output buffer reading management section 2232 outputs information indicating the amount of written data as output buffer data amount information OBDI to the output buffer data amount management section 2231 for each monitored data buffer.

Also, the output buffer reading management section 2232 outputs a control signal for controlling the reading (output) of the input data (processed pixel data) stored in the output buffer section 222 to the output buffer section 222 on the basis of the output buffer reading reservation signal OBRR output from the output buffer data amount management section 2231.

More specifically, on the basis of the information of the set of data buffers included in the output buffer reading reservation signal OBRR output from the output buffer data amount management section 2231, the output buffer reading management section 2232 outputs an output buffer reading selection signal OBRS for selecting a set of data buffers from which the stored pixel data is read (output) to the selector 2223 provided in the output buffer section 222. The output buffer reading management section 2232 outputs an output buffer reading signal OBR indicating a timing at which the processed pixel data of the amount of data requested from the external image processing device 600 is read and output to the external image processing device 600 to a selected set of data buffers within the output buffer section 222 in accordance with the output buffer reading reservation signal OBRR. Thereby, in accordance with the output buffer reading signal OBR, the output buffer section 222 reads the processed pixel data of the amount of data which has been stored and requested and outputs the read data as external output data to the external image processing device 600. At this time, the output buffer reading management section 2232 outputs an output data validity signal indicating whether or not external output data (processed pixel data) included in the unit line read (output) as external output data from the set of data buffers is valid processed pixel data to the external image processing device 600.

Also, if the processed pixel data of the margin region is stored in the margin storage buffer 22222*a* or the margin storage buffer 22222*b*, the output buffer reading management section 2232 first outputs the output buffer reading signal OBR of a timing at which processed pixel data of a margin region overlapping a front margin region is read from the margin storage buffer 22222*a* or the margin storage buffer 22222*b* to the set of data buffers included in the output buffer reading reservation signal OBRR. Next, the output buffer reading management section 2232 outputs the output buffer reading signal OBR of a timing at which processed pixel data other than that of the margin region is read from the output buffer 22221*a* or the output buffer 22221*b* to a set of data buffers included in the output buffer reading reservation signal OBRR. Thereafter, the output buffer reading management section 2232 outputs the output buffer reading signal OBR of a timing at which processed pixel data of a margin region overlapping a rear rectangular region is read from the output buffer 22221*a* or the output buffer 22221*b* to a set of data buffers included in the output buffer reading reservation signal OBRR. Thereby, the output buffer section 222 outputs external output data in a state in which processed pixel data of a margin region and processed pixel data other than that of the margin region are combined to the external image processing device 600. In switching of a reading destination of the input data (the processed pixel data) by the output buffer reading management section 2232, for example, a reading destination of the next input data (processed pixel data) is switched to the output buffer 22221*a* or the output buffer 22221*b* after the amount of valid input data (processed pixel data) read from the output buffer section 222 is measured and a predetermined amount of input data (processed pixel data) is read from the margin storage buffer 22222*a* or the margin storage buffer 22222*b*.

Also, when the reading of the processed pixel data of the amount of data requested from the external image processing device 600 is completed in accordance with the output buffer reading reservation signal OBRR, the output buffer reading management section 2232 outputs an output buffer reading completion signal OBRC indicating that reading of the input data (the processed pixel data) from the data buffer section 2222 has been completed to the image processing module input control section 221. This output buffer reading completion signal OBRC can also be output, for example, by measuring the amount of processed pixel data read from the output buffer section 222.

According to such a configuration, the external output section in the external input/output module 22 divides the input data (the processed pixel data) output from the image processing module 21 connected to the previous stage into processed pixel data other than that of the margin region and the processed pixel data of the margin region and temporarily stores the divided input data in a set of data buffers.

The external output section of the external input/output module 22 reads the processed pixel data of the margin region and the processed pixel data other than that of the margin region stored in the set of data buffers in response to a data output request from the connected external image processing device 600 and outputs the read processed pixel data as external output data.

Next, the external input section in the external input/output module 22 will be described.

As described above, the input buffer section 225 is a data buffer configured to temporarily store external input data (externally processed pixel data) input to the external input/output module 22. The input buffer section 225 shown in FIG. 8 includes a selector 2251, a data buffer section 2252, and a selector 2253. Also, the data buffer section 2252 includes two data buffers of an input buffer 2252a and an input buffer 2252b. Similar to the data buffer section 2222 provided in the output buffer section 222, the data buffer section 2252 has a double buffer configuration including two data buffers. In the data buffer section 2252, an operation is performed so that the writing and reading of the externally processed pixel data of one processing unit can be performed in the same period by alternately performing switching between the storage (writing) and output (reading) of the externally processed pixel data in opposite operations in each set of data buffers.

The selector 2251 is a selection section configured to select a data buffer in which externally processed pixel data is written in the input buffer section 225. In accordance with an input buffer writing selection signal IBWS output from the external input control section 224, the selector 2251 selects one data buffer either of the input buffer 2252a or the input buffer 2252b as a data buffer in which externally processed pixel data is written. Then, the selector 2251 outputs external input data (externally processed pixel data) input to the external input/output module 22 to one data buffer of either the input buffer 2252a or the input buffer 2252b which has been selected.

The selector 2253 is a selection section configured to select a data buffer from which externally processed pixel data stored in the input buffer section 225 is read. In accordance with an input buffer reading selection signal IBRS output from the image processing module output control section 226, the selector 2253 selects a data buffer of either the input buffer 2252a or the input buffer 2252b as a data buffer from which the stored externally processed pixel data is read. Then, the selector 2253 outputs the externally processed pixel data read from either the selected data buffer of the input buffer 2252a or the input buffer 2252b as output data to the image processing module 21 connected to the subsequent stage.

Each of the input buffer 2252a and the input buffer 2252b is a data buffer with a storage capacity for temporarily storing externally processed pixel data for a predetermined number of unit lines. In the data buffer of either the input buffer 2252a or the input buffer 2252b selected as the data buffer in which the externally processed pixel data is written by the selector 2251, the external input data (the externally processed pixel data) input via the selector 2251 is written (stored) in accordance with an input buffer writing signal IBW output from the external input control section 224. On the other hand, in the data buffer of either the input buffer 2252a or the input buffer 2252b selected as the data buffer from which the stored externally processed pixel data is read by the selector 2253, the stored externally processed pixel data is read and output to the selector 2253 in accordance with an input buffer reading signal IBR output from the image processing module output control section 226.

Also, unlike the data buffer section 2222 provided in the output buffer section 222, the data buffer section 2252 does not have a margin storage buffer corresponding to the margin region. This is because the image processing module 21 connected to the stage subsequent to the external input/output module 22 is configured to include the margin storage buffer 212 and therefore it is unnecessary to provide a margin storage buffer in the data buffer section 2252. However, for example, if the image processing module 21 connected to the subsequent stage may also configured without including the margin storage buffer 212, the data buffer section 2252 may be configured to include a storage buffer as in the data buffer section 2222.

As described above, the external input control section 224 controls the storage (writing) of the external input data (externally processed pixel data) output from the external image processing device 600 in the input buffer section 225. The external input control section 224 shown in FIG. 8 includes an input buffer free capacity management section 2241 and an input buffer writing management section 2242.

On the basis of input buffer empty information IBEI output from the input buffer writing management section 2242, the input buffer free capacity management section 2241 determines a free storage capacity in each of the input buffer 2252a and the input buffer 2252b provided in the input buffer section 225. Then, in response to a data input request from the external image processing device 600, the input buffer free capacity management section 2241 outputs an input buffer writing reservation signal IBWR for making a reservation for storing (writing) external input data (externally processed pixel data) in the data buffer to the input buffer writing management section 2242.

More specifically, the input buffer free capacity management section 2241 determines whether or not there is a free storage capacity for writing (temporarily storing) external input data (externally processed pixel data) output from the external image processing device 600 in the data buffer section 2252 on the basis of information of the free capacity of the input buffer 2252a and the input buffer 2252b indicated by the input buffer empty information IBEI output from the input buffer writing management section 2242. At this time, the input buffer free capacity management section 2241 determines whether or not there is a free storage capacity in another data buffer different from a data buffer storing externally processed pixel data which is not read by the image processing module output control section 226 on the basis of the input buffer empty information IBEI.

Then, if a result of determining the free storage capacity indicates that there is a free storage capacity in another data buffer different from a data buffer already storing externally processed pixel data to be read by the image processing module output control section 226, the input buffer free capacity management section 2241 determines that the data buffer is in a state in which the external input data (the externally processed pixel data) output from the external image processing device 600 can be written. In this case, when a data input request signal for requesting the input of external input data (externally processed pixel data) is input from the external image processing device 600, the input buffer free capacity management section 2241 outputs an input buffer writing reservation signal IBWR for making a reservation for writing (temporary storing) external input data (externally processed pixel data) corresponding to the data input request signal to the input buffer writing management section 2242.

Also, the input buffer writing reservation signal IBWR output by the input buffer free capacity management section 2241 includes information of a data buffer for making a reservation for writing (temporarily storing) external input data (externally processed pixel data). Also, the input buffer writing reservation signal IBWR also includes information indicating the amount of external input data (externally processed pixel data) output from the external image processing device 600, i.e., the amount of external input data (externally processed pixel data) to be written (temporarily stored) in the data buffer section 2252. Also, the input buffer free capacity management section 2241 may output a data input reception signal indicating that input of external input data (externally processed pixel data) based on the data input request signal has been received to the external image processing device 600.

On the other hand, if a result of determining the free storage capacity indicates that there is no free storage capacity in the data buffer, the input buffer free capacity management section 2241 determines that the external input data (externally processed pixel data) output from the external image processing device 600 cannot be written in any data buffer. In this case, the input buffer free capacity management section 2241 may output a data input reception signal indicating that the input of the external input data (the externally processed pixel data) cannot be received in response to the data input request signal to the external image processing device 600. Also, the data input reception signal at this time may indicate a state in which the input of the external input data (externally processed pixel data) cannot be received by a logic level of the data input reception signal or the state may be indicated by a signal different from the data input reception signal. Also, the input buffer free capacity management section 2241 may indicate that an output of external input data (externally processed pixel data) is requested or not requested by a signal different from the data input reception signal (for example, an external data output request signal or the like).

The input buffer writing management section 2242 monitors the free storage capacity in each of the input buffer 2252*a* and the input buffer 2252*b* provided in the input buffer section 225 and outputs the input buffer empty information IBEI indicating a result of monitoring the free storage capacity to the input buffer free capacity management section 2241.

More specifically, the input buffer writing management section 2242 monitors the free storage capacity of each of the input buffer 2252*a* and the input buffer 2252*b* provided in the input buffer section 225. Then, the input buffer writing management section 2242 outputs information indicating the free storage capacity as the input buffer empty information IBEI to the input buffer free capacity management section 2241 for each monitored data buffer.

Also, the input buffer writing management section 2242 outputs a control signal for controlling the writing of external input data (externally processed pixel data) to the input buffer section 225 on the basis of the input buffer writing reservation signal IBWR output from the input buffer free capacity management section 2241.

More specifically, the input buffer writing management section 2242 outputs an input buffer writing selection signal IBWS for selecting a data buffer in which external input data (externally processed pixel data) output from the external image processing device 600 is written (temporarily stored) to the selector 2251 provided in the input buffer section 225 on the basis of data buffer information included in the input buffer writing reservation signal IBWR output from the input buffer free capacity management section 2241. In accordance with the input buffer writing reservation signal IBWR, the input buffer writing management section 2242 outputs the input buffer writing signal IBW indicating a timing at which the external input data (externally processed pixel data) output from the external image processing device 600 is written to the selected data buffer within the input buffer section 225. At this time, the input buffer writing management section 2242 determines whether or not currently input external input data is externally processed pixel data which is valid on the basis of an input data validity signal indicating whether or not the externally processed pixel data included in the unit line output together with the external input data (the externally processed pixel data) from the external image processing device 600 is externally processed pixel data which is valid. Then, the input buffer writing management section 2242 outputs the input buffer writing signal IBW of a timing at which only externally input data (externally processed pixel data) which is valid is written to the set of data buffers included in the input buffer writing reservation signal IBWR. Thereby, in the input buffer section 225, only external input data (externally processed pixel data) which is valid is written (temporarily stored) in a reserved set of data buffers.

Also, the input buffer writing reservation signal IBWR also includes information indicating the amount of external input data (externally processed pixel data) output from the external image processing device 600. Thus, the input buffer writing management section 2242 causes external input data (externally processed pixel data) of the amount output from the external image processing device 600 to be written (temporarily stored) in the input buffer section 225. For example, by measuring the amount of external input data (externally processed pixel data) which is valid input from the external image processing device 600 for the amount of external input data (externally processed pixel data) to be written in the input buffer section 225 by the input buffer writing management section 2242, external input data (externally processed pixel data) of the amount indicated by the input buffer writing reservation signal IBWR is written (temporarily stored) in the input buffer 2252*a* or the input buffer 2252*b*.

Also, the input buffer writing management section 2242 outputs input buffer flag information IBFI based on information of each of the input buffer empty information IBEI, the input buffer writing reservation signal IBWR output from the input buffer free capacity management section 2241, and the input buffer reading completion signal IBRC output from the image processing module output control section 226 to the image processing module output control section 226.

More specifically, if the input buffer empty information IBEI indicates that there is a free storage capacity in both or one of the input buffer 2252*a* and the input buffer 2252*ab*, the input buffer writing management section 2242 outputs the input buffer flag information IBFI indicating the buffer empty state to the image processing module output control section 226. Also, if the input buffer writing reservation signal IBWR indicating that a reservation for storing (writing) external input data (externally processed pixel data) is made is input from the input buffer free capacity management section 2241, the input buffer writing management section 2242 outputs the input buffer flag information IBFI indicating the writing state to the image processing module output control section 226. Also, when the writing of external input data (externally processed pixel data) which is valid to the input buffer section 225 is completed according to the input buffer writing signal IBW, the input buffer writing management section 2242 outputs the input buffer flag information IBFI indicating the buffer full state to the image processing module output control section 226. When the input buffer reading completion signal IBRC is input from the image processing module output control section 226, the input buffer writing management section 2242 outputs the input buffer flag information IBFI indicating the buffer empty state to the image processing module output control section 226. Also, the input buffer flag information IBFI may be information including a plurality of pieces of information corresponding to the input buffer 2252a and the input buffer 2252b provided in the input buffer section 225.

As described above, the image processing module output control section 226 controls the output (reading) of the external input data (externally processed pixel data) stored in the input buffer section 225. The image processing module output control section 226 shown in FIG. 8 includes an input buffer data amount management section 2261 and an input buffer reading management section 2262.

The input buffer data amount management section 2261 determines the amount of external input data (externally processed pixel data) stored in each of the input buffer 2252a and the input buffer 2252b provided in the input buffer section 225 on the basis of input buffer data amount information IBDI output from the input buffer reading management section 2262. The input buffer data amount management section 2261 outputs an input buffer reading reservation signal IBRR for making a reservation for outputting (reading) external input data (externally processed pixel data) from the data buffer in response to a data output request from the image processing module 21 connected to the subsequent stage to the input buffer reading management section 2262.

More specifically, the input buffer data amount management section 2261 determines whether or not the external input data (externally processed pixel data) to be output to the image processing module 21 connected to the subsequent stage is written (temporarily stored) in the data buffer section 2252 on the basis of information about amounts of data stored in the input buffer 2252a and the input buffer 2252b indicated by the input buffer data amount information IBDI output from the input buffer reading management section 2262. At this time, the input buffer data amount management section 2261 determines whether or not there is external input data (externally processed pixel data) completely written in another data buffer different from a data buffer in which external input data (externally processed pixel data) is written by the external input control section 224 on the basis of the input buffer data amount information IBDI.

Then, if a result of determining the amount of externally processed pixel data indicates that externally processed pixel data output as output data to the image processing module 21 connected to the subsequent stage is already stored in the data buffer, the input buffer data amount management section 2261 determines that the data buffer is in a state in which the externally processed pixel data can be read and output to the image processing module 21 connected to the subsequent stage. In this case, when a data request signal for requesting an output of output data (externally processed pixel data) is input from the image processing module 21 connected to the subsequent stage, the input buffer data amount management section 2261 outputs the input buffer reading reservation signal IBRR for making a reservation for reading (outputting) the output data (the externally processed pixel data) corresponding to the data request signal to the input buffer reading management section 2262.

Also, the input buffer reading reservation signal IBRR output by the input buffer data amount management section 2261 includes information of a data buffer for which it is determined that the writing of externally processed pixel data is completed, i.e., information of a data buffer from which externally processed pixel data is read. Also, the input buffer data amount management section 2261 outputs a data acknowledge signal indicating that the output of output data (externally processed pixel data) based on the data request signal has been received to the image processing module 21 connected to the subsequent stage.

On the other hand, if a result of determining the amount of externally processed pixel data indicates that no externally processed pixel data to be output as the output data is stored in the data buffer, the input buffer data amount management section 2261 determines that the externally processed pixel data cannot be read from any data buffer. In this case, the input buffer data amount management section 2261 outputs a data acknowledge signal indicating a state in which the output of the output data (the externally processed pixel data) based on the data request signal cannot be received to the image processing module 21 connected to the subsequent stage. Also, the data acknowledge signal at this time may indicate a state in which the output of the output data (the externally processed pixel data) cannot be received by a logic level of the data acknowledge signal or the state may be indicated by a signal different from the data acknowledge signal.

The input buffer reading management section 2262 monitors the amount of external input data (externally processed pixel data) written in each of the input buffer 2252a and the input buffer 2252b provided in the input buffer section 225 and outputs the input buffer data amount information IBDI indicating the result of monitoring the amount of data to the input buffer data amount management section 2261 on the basis of the input buffer flag information IBFI output from the input buffer writing management section 2242.

More specifically, the input buffer reading management section 2262 monitors the amount of data written in each of the input buffer 2252a and the input buffer 2252b provided in the input buffer section 225. The input buffer reading management section 2262 outputs information indicating the amount of written data for each monitored data buffer as the input buffer data amount information IBDI to the input buffer data amount management section 2261.

Also, the input buffer reading management section 2262 outputs a control signal for controlling the reading (output) of external input data (externally processed pixel data) stored in the input buffer section 225 to the input buffer section 225 on the basis of the input buffer reading reservation signal IBRR output from the input buffer data amount management section 2261.

More specifically, the input buffer reading management section 2262 outputs an input buffer reading selection signal IBRS for selecting a data buffer for reading (outputting) the stored externally processed pixel data to the selector 2253 provided in the input buffer section 225 on the basis of information of the data buffer included in the input buffer reading reservation signal IBRR output from the input buffer data amount management section 2261. Then, in accordance with the input buffer reading reservation signal IBRR, the input buffer reading management section 2262 outputs the input buffer reading signal IBR indicating a timing at which externally processed pixel data of the amount of data requested from the image processing module 21 connected to the subsequent stage is read and output to the image processing module 21 connected to the subsequent stage to a data buffer selected within the input buffer section 225. Thereby, in accordance with the input buffer reading signal IBR, the input buffer section 225 reads externally processed pixel data of the requested amount of stored data and outputs the read data as output data to the image processing module 21 connected to the subsequent stage. At this time, the input buffer reading management section 2262 outputs a data validity signal indicating whether or not external input data (externally processed pixel data) included in a unit line read (output) as output data from the data buffer is externally processed pixel data which is valid to the image processing module 21 connected to the subsequent stage.

Also, when the reading of the externally processed pixel data of the amount of data requested from the image processing module 21 connected to the subsequent stage is completed in accordance with the input buffer reading reservation signal IBRR, the input buffer reading management section 2262 outputs an input buffer reading completion signal IBRC indicating that the reading of the external input data (externally processed pixel data) from the data buffer section 2252 has been completed to the external input control section 224. The input buffer reading completion signal IBRC can be output, for example, by measuring the amount of externally processed pixel data read from the input buffer section 225.

According to such a configuration, the external input section of the external input/output module 22 temporarily stores the external input data (the externally processed pixel data) output from the connected external image processing device 600 in the input buffer section 225, reads the externally processed pixel data stored in the input buffer section 225 in response to a data output request from the image processing module 21 connected to the subsequent stage, and outputs the read data as output data.

According to such a configuration, the external input/output module 22 provided in the image processing section 20 outputs input data (processed pixel data) output from the image processing module 21 connected to the previous stage to the connected external image processing device 600 and outputs the external input data (the externally processed pixel data) output from the external image processing device 600 to the image processing module 21 connected to the subsequent stage. Thereby, the external input/output module 22 can incorporate external image processing of the connected external image processing device 600 between the image processing module 21 connected to the previous stage and the image processing module 21 connected to the subsequent stage in the pipeline configured in the image processing section 20. Thereby, in the image processing device 1, it is possible to execute a series of image processing in which external image processing of the external image processing device 600 is incorporated into the pipeline processing configured in the image processing section 20.

Also, the external input/output module 22 provided in the image processing section 20 includes a margin storage buffer 22222 configured to store pixel data included in a margin region overlapping between adjacent rectangular regions when still-image data of one frame to be subjected to image processing is divided into a plurality of rectangular regions each having a predetermined size and image processing is performed for each rectangular region. Thereby, it is possible to reduce power consumption of the image processing device 1 by avoiding overload on the bus bandwidth of the data bus 10 when image processing is performed without having to re-read image data stored in the margin storage buffer 22222 when image processing is performed on the next margin region in the external input/output module 22.

Also, in the configuration of the external input/output module 22 shown in FIG. 8, a configuration in which pixel data is exchanged with the image processing module 21 connected to the previous stage or the subsequent stage or the external image processing device 600 according to the request signal, the acknowledge signal, and the valid signal is shown. However, a method in which the external input/output module 22 exchanges pixel data with the image processing module 21 connected to the previous stage or the subsequent stage or the external image processing device 600 is not limited to a method based on the request signal, the acknowledge signal, and the valid signal and a data transmission method based on other various methods may be adopted.

According to the first embodiment, there is provided an image processing device (the image processing device 1) in which an image processing section (the image processing section 20) for configuring a pipeline by connecting a plurality of processing modules (the image processing modules 21-1 to 21-4) for performing predetermined processing on input image data (still-image data) in series and performing pipeline processing in which each of the image processing modules 21-1 to 21-4 sequentially performs the processing is connected to a data bus (the data bus 10) and performs image processing by dividing a region of the still-image data of one frame into a plurality of blocks (rectangular regions, for example, the rectangular regions R1 to R25) each having a predetermined size and reading the image data (block image data) included in the rectangular region from a data storage section (the frame memory 500) connected to the data bus 10 via the data bus 10 for each rectangular region, wherein the image processing section 20 includes an external input/output module (the external input/output module 22) incorporated into the pipeline as the processing module configured to perform processing different from the processing to be performed by each of the image processing modules 21-1 to 21-4, and wherein the external input/output module 22 is configured to directly output processed data (the input data, the pixel data, or the processed pixel data) obtained by performing the processing on the image data (the pixel data) included in the rectangular region in a first processing module (for example, the image processing module 21-2) which is the processing module located at a stage previous to a position where the external input/output module 22 is incorporated into the pipeline (as the external output data) to an external processing section (the external image processing device 600) outside the image processing section 20 without involving the data bus 10 and directly output externally processed data (external input data or externally processed pixel data) input by the external image processing device 600 performing external processing (external image processing) on the processed data (the input data, the pixel data, or the processed pixel data) to a second processing module (for example the image processing module 21-3) which is the processing module located at a stage subsequent to the first processing module (for example, the image processing module 21-2) in the pipeline without involving the data bus 10.

Also, according to the present first embodiment, in the image processing device 1, the external input/output module 22 includes an output buffer section (the output buffer section 222) configured to temporarily store the processed data (the input data, the pixel data, or the processed pixel data); and an input buffer section (the input buffer section 225) configured to temporarily store the externally processed data (the external input data or the externally processed pixel data), wherein the external input/output module 22 is configured to temporarily store the processed data (the processed pixel data) output by the first processing module (for example, the image processing module 21-2) in the output buffer section 222 and output the processed data (processed pixel data) stored in the output buffer section 222 (as external output data) in response to a request from the external image processing device 600, and wherein the external input/output module 22 is configured to temporarily store the externally processed data (the external input data or the externally processed pixel data) output by the external image processing device 600 in the input buffer section 225 and output the externally processed data (the external input data or the externally processed pixel data) stored in the input buffer section 225 (as the output data) in response to a request from the second processing module.

Also, according to the present first embodiment, in the image processing device 1, the external input/output module 22 further includes a processing module input control section (the image processing module input control section 221) configured to control writing of the processed data (the input data, the pixel data, or the processed pixel data) in the output buffer section 222 on the basis of a storage capacity of the output buffer section 222; an external output control section (the external output control section 223) configured to control reading of the processed data (the input data, the pixel data, or the processed pixel data) from the output buffer section 222 on the basis of the amount of the processed data (the input data, the pixel data, or the processed pixel data) stored in the output buffer section 222; an external input control section (the external input control section 224) configured to control writing of the externally processed data (the external input data or the externally processed pixel data) in the input buffer section 225 on the basis of a storage capacity of the input buffer section 225; and a processing module output control section (the image processing module output control section 226) configured to control reading of the externally processed data (the external input data or the externally processed pixel data) from the input buffer section 225 on the basis of the amount of the externally processed data (the external input data or the externally processed pixel data) stored in the input buffer section 225.

Also, according to the present first embodiment, in the image processing device 1, the image processing module input control section 221 is configured to cause the processed data (the input data, the pixel data, or the processed pixel data) to be written in the output buffer section 222 for each rectangular region for performing the processing in the first processing module (for example, the image processing module 21-2), the external output control section 223 is configured to cause the processed data (the input data, the pixel data, or the processed pixel data) stored in the output buffer section 222 to be read for each unit (for example, a unit line) for performing the external image processing in the external image processing device 600, the external input control section 224 is configured to cause the externally processed data (the external input data or the externally processed pixel data) to be written in the input buffer section 225 for each unit for performing the external image processing in the external image processing device 600, and the image processing module output control section 226 is configured to cause the externally processed data (the external input data or the externally processed pixel data) stored in the input buffer section 225 to be read for each rectangular region for performing the processing in the second processing module (for example, the image processing module 21-3).

Also, according to the present first embodiment, in the image processing device 1, the output buffer section 222 includes a margin storage buffer (the margin storage buffer 22222, for example, the margin storage buffer 22222a or the margin storage buffer 22222b) configured to temporarily store the processed data (the input data, the pixel data, or the processed pixel data) of a margin region where the rectangular region to be processed overlaps the rectangular region adjacent to a rear side in a direction of advance when the pipeline processing is performed within the processed data (the input data, the pixel data, or the processed pixel data) output by the first processing module (for example, the image processing module 21-2); and an output buffer (the output buffer 22221, for example, the output buffer 22221a or the output buffer 22221b) configured to temporarily store the processed data (the input data, the pixel data, or the processed pixel data) outside the margin region, wherein the image processing module input control section 221 is configured to cause the processed data (the input data, the pixel data, or the processed pixel data) outside the margin region to be written in the output buffer (for example, the output buffer 22221a or the output buffer 22221b) and cause the processed data (the input data, the pixel data, or the processed pixel data) of the margin region to be written in the margin storage buffer (for example, the margin storage buffer 22222a or the margin storage buffer 22222b) for each rectangular region on which the first processing module (for example, the image processing module 21-2) has performed the processing, and wherein the external output control section 223 is configured to cause the processed data (the input data, the pixel data, or the processed pixel data) stored in the output buffer (for example, the output buffer 22221b or the output buffer 22221a) to be read after causing the processed data (the input data, the pixel data, or the processed pixel data) stored in the margin storage buffer (for example, the margin storage buffer 22222a or the margin storage buffer 22222b) to be read in accordance with a request from the external image processing device 600.

Also, according to the present first embodiment, in the image processing device 1, the external input/output module 22 is incorporated in at least one position of a beginning, a middle, and an end of the pipeline.

Also, according to the present first embodiment, in the image processing device 1, a storage capacity of the output buffer section 222 and a storage capacity of the input buffer section 225 are less than a storage capacity for storing all pixel data (pixel data) included in the image data of one frame (still-image data).

As described above, the image processing device 1 according to the first embodiment includes the external input/output module 22 directly connected to the external image processing device 600 without involving the data bus 10 within the image processing section 20 configured to perform the pipeline processing. Thereby, in the image processing device 1 according to the first embodiment, it is possible to transmit processed pixel data during the pipeline processing to the external image processing device 600 connected outside the image processing device 1. In the image processing device 1 according to the first embodiment, it is possible to perform subsequent image processing in the pipeline processing on the processed pixel data (the externally processed pixel data) on which the external image processing device 600 has performed the image processing. Thereby, in the image processing device 1 according to the first embodiment, it is possible to incorporate image processing of the external image processing device 600 for providing extensibility during image processing based on the pipeline processing which has already been configured.

Moreover, in the image processing device 1 according to the first embodiment, pixel data for use in the image processing to be extended by the external image processing device 600 can be transmitted to and from the external image processing device 600 without using a storage section such as the frame memory 500. Thus, in the image processing device 1 according to the first embodiment, it is possible to perform a series of image processing in a state in which the image processing to be extended is incorporated without interrupting the pipeline processing which has already been configured.

Also, in the image processing device 1 according to the first embodiment, the external input/output module 22 includes a margin storage buffer 22222 configured to store pixel data included in a margin region overlapping between adjacent rectangular regions when image processing is performed for each margin region when image data of one frame to be subjected to image processing is divided into a plurality of rectangular regions each having a predetermined size and image processing is performed for each rectangular region. Thereby, in the image processing device 1 according to the first embodiment, even when image processing is performed for each rectangular region obtained through division in the external image processing device 600 connected to the external input/output module 22, it is possible to perform image processing to be extended by the external image processing device 600 in a state in which the margin region is included therein without having to re-read image data stored in the margin storage buffer 22222 when image processing is performed on the next margin region. Thereby, in the image processing device 1 according to the first embodiment, it is possible to extend image processing without causing overload on the bus bandwidth of the data bus 10 to which the frame memory 500 is connected or an increase in power consumption of the image processing device 1 and without degrading the performance of the imaging device 100 equipped with the image processing device 1 according to the first embodiment.

Also, in the image processing device 1 according to the first embodiment, a configuration in which external image processing of the external image processing device 600 is incorporated between the image processing module 21-2 and the image processing module 21-3 provided in the image processing section 20 within the image processing device 1 has been described. However, as described above, in the image processing device 1 according to the first embodiment, a connection switching unit (not shown) can change an order of image processing to be performed by the image processing section 20 or a position of external image processing to be incorporated into the pipeline. Accordingly, the position at which the external image processing is incorporated into the pipeline processing in the image processing device 1 according to the first embodiment is not limited to the position described in the first embodiment. For example, it is possible to incorporate the external image processing of the external image processing device 600 between the image processing module 21-1 and the image processing module 21-2 according to settings of the connection switching unit (not shown).

Also, in the image processing device 1 according to the first embodiment, a configuration in which the external input/output module 22 provided in the image processing section 20 is connected to the external image processing device 600 provided outside the image processing device 1 and exchanges pixel data with the external image processing device 600 is shown. In other words, in the image processing device 1 according to the first embodiment, a configuration in which a component for executing the image processing to be incorporated into the pipeline processing and extended us the external image processing device 600 connected outside the image processing device 1 has been described. However, the component (the processing device) connected to the external input/output module 22 and configured to extend the image processing is not limited to the component outside the image processing device 1 shown in the first embodiment. For example, software processing of a CPU, a DSP, or the like can be incorporated into pipeline processing as image processing to be extended. The component such as the CPU or the DSP is a component outside the image processing section 20, but is a component included in the image processing device 1. In this case, by connecting the CPU, the DSP, or the like serving as a component (a processing device) for extending image processing and the external input/output module 22 in the image processing device 1 without involving the data bus 10, it is similarly possible to incorporate image processing for providing extensibility into image processing based on pipeline processing already configured in the image processing section 20.

Also, in the image processing, there is a method in which processing is performed in different settings for each rectangular region. For example, in coordinate data processing, distortion correction processing, shading correction processing and the like, it is necessary to set a different setting value (a set parameter) for each rectangular region. In this case, the image processing module 21 or the external image processing device 600 needs to perform image processing on the basis of a set parameter associated with each rectangular region.

Second Embodiment

Figure 9:
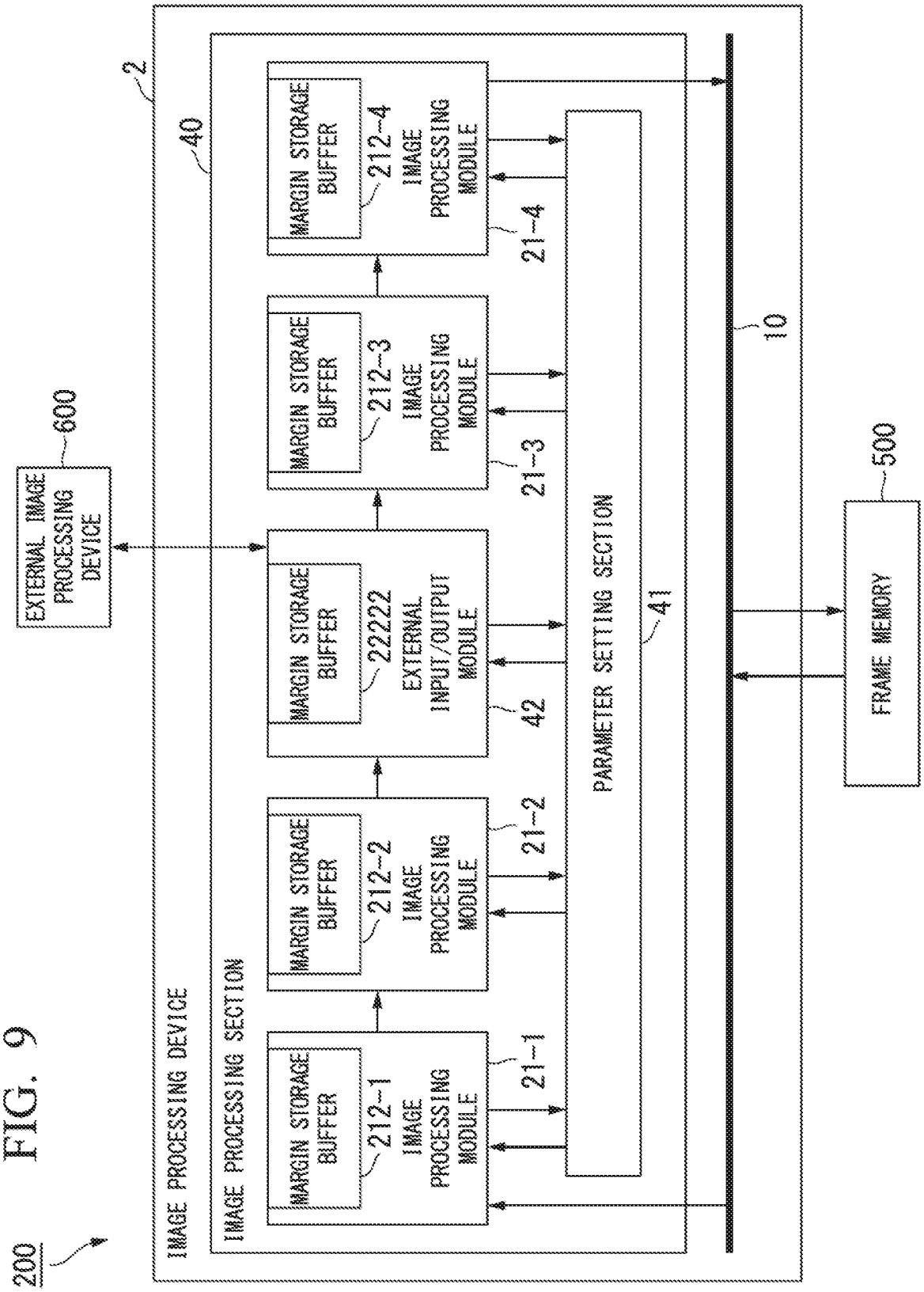
FIG. 9 is a block diagram showing a schematic configuration of an image processing device according to a second embodiment of the present invention.

Next, a second embodiment of the present invention will be described. Also, in the following description, for example, a case in which an image processing device according to the second embodiment of the present invention is mounted on an imaging device such as a still-image camera (hereinafter referred to as an "imaging device 200") will be described. FIG. 9 is a block diagram showing a schematic configuration of the image processing device according to the second embodiment of the present invention. Also, in FIG. 9, a frame memory 500 and an external image processing device 600 are shown as components within the imaging device 200 related to the image processing device 2 according to the second embodiment of the present invention.

The image processing device 2 shown in FIG. 9 includes a data bus 10 and an image processing section 40. Also, the image processing section 40 includes a parameter setting section 41, four image processing modules 21 (image processing modules 21-1 to 21-4), and an external input/output module 42. Each of the image processing modules 21 has a corresponding margin storage buffer 212. Also, the external input/output module 42 includes a margin storage buffer 22222 configured to temporarily store image data of a margin region.

The configuration of the image processing device 2 shown in FIG. 9 is a configuration in which the image processing section 20 provided in the image processing device 1 according to the first embodiment shown in FIG. 1 is replaced with an image processing section 40. Also, the image processing section 40 provided in the image processing device 2 shown in FIG. 9 has a configuration in which the external input/output module 22 provided in the image processing section 20 provided in the image processing device 1 according to the first embodiment shown in FIG. 1 is replaced with an external input/output module 42.

Also, the other components of the image processing device 2 and the image processing section 40 provided in the image processing device 2 are similar to those of the image processing device 1 according to the first embodiment shown in FIG. 1 and the image processing section 20 provided in the image processing device 1. Accordingly, in the following description, the components of the image processing device 2 and the image processing section 40 provided in the image processing device 2 similar to those of the image processing device 1 according to the first embodiment shown in FIG. 1 and the image processing section 20 provided in the image processing device 1 are denoted by the same reference signs and a detailed description related to the components will be omitted. Also, in FIG. 9, as in the imaging device 100 shown in FIG. 1, illustration of other components connected to each component provided in the imaging device 200 and the data bus 10 in the image processing device 2 is also omitted.

Similar to the image processing section 20 provided in the image processing device 1 according to the first embodiment shown in FIG. 1, the image processing section 40 performs various image processing predetermined in the image processing device 2 for each rectangular region obtained by dividing still-image data of one frame stored in the frame memory 500 into a plurality of rectangular regions each having a predetermined size. Also, similar to the image processing section 20 provided in the image processing device 1 according to the first embodiment, the image processing section 40 also has a function of changing the configuration of the pipeline.

Also, similar to the image processing section 20 provided in the image processing device 1 according to the first embodiment, the image processing section 40 also has a function of incorporating image processing different from image processing to be executed by each of the image processing modules 21-1 to 21-4 into the pipeline processing. However, in the image processing device 2, a set parameter corresponding to each rectangular region is associated and the image processing module 21 and a component configured to perform image processing to be incorporated into the pipeline processing (the external image processing device 600 in the configuration of FIG. 9) perform image processing on the basis of the set parameter associated with each rectangular region. However, in the following description, for ease of description, a case in which each of the image processing module 21 within the image processing section 40 provided in the image processing device 2 and the external image processing device 600 provided outside the image processing device 2 performs image processing on the basis of the set parameter associated with the rectangular region will be described. Accordingly, the image processing (the external image processing) to be executed in the external image processing device 600 and incorporated into the pipeline processing is image processing which is not executed by any image processing module 21 of the image processing modules 21-1 to 21-4 as in the image processing section 20 provided in the image processing device 1 according to the first embodiment shown in FIG. 1.

Also, in the image processing device 2, as in the image processing section 20 provided in the image processing device 1 according to the first embodiment, the pipeline configuration in the image processing section 40 is also changed (set) by, for example, a control section (not shown).

In FIG. 9, a configuration in which external image processing to be executed by the external image processing device 600 is incorporated into the pipeline by incorporating the external input/output module 42 between the image processing module 21-2 and the image processing module 21-3 is shown. That is, in the image processing section 40 shown in FIG. 9, as in the image processing section 20 provided in the image processing device 1 according to the first embodiment shown in FIG. 1, a state in which a pipeline for sequentially performing image processing of the image processing module 21-1, image processing of the image processing module 21-2, image processing of the external image processing device 600, image processing of the image processing module 21-3, and image processing of the image processing module 21-4 is configured is shown.

Also, in the image processing device 2, as in the image processing section 20 provided in the image processing device 1 according to the first embodiment, a position where the external input/output module 42 is incorporated into the pipeline is also set by, for example, the control section (not shown). Accordingly, in the image processing device 2, as in the image processing section 20 provided in the image processing device 1 according to the first embodiment, a position where the external input/output module 42 is incorporated into the pipeline is also not limited to a position shown in FIG. 9 and the external input/output module 42 can be incorporated at any position within the pipeline.

When the image processing module 21 provided within the image processing section 40 performs image processing, the parameter setting section 41 sets set parameters corresponding to the rectangular regions to be subjected to image processing. More specifically, for example, when still-image data of one frame is divided into 25 rectangular regions including rectangular regions R1 to R25 as shown in FIG. 2, the parameter setting section 41 sets a set parameter corresponding to the rectangular region R1 in the image processing module 21-1 when the image processing module 21-1 performs image processing on the rectangular region R1. Also, the parameter setting section 41 sets a set parameter corresponding to a rectangular region in (to) which block image data to be output to the external image processing device 600 is included (belongs) when the external input/output module 42 incorporated into the pipeline in the image processing section 40 outputs block image data included in each rectangular region to be subjected to the external image processing to the external image processing device 600. More specifically, when the pixel data (the processed pixel data) output from the image processing module 21 connected to the previous stage is output to the external image processing device 600, the parameter setting section 41 sets the set parameter corresponding to the rectangular region to which the processed pixel data belongs in the external input/output module 42.

As in the external input/output module 22 according to the first embodiment, the external input/output module 42 is an interface module configured to incorporate external image processing to be executed by a component provided outside the image processing section 40 into pipeline processing. Similar to the external input/output module 22 according to the first embodiment, the external input/output module 42 outputs pixel data (processed pixel data) output from the image processing module 21 connected to the previous stage to the external image processing device 600 directly connected without involving the data bus 10, for example, in accordance with control from a control section (not shown).

At this time, when the pixel data (the processed pixel data) is output to the external image processing device 600, the external input/output module 42 outputs the pixel data in association with the set parameters set by the parameter setting section 41. For example, the external input/output module 42 may output the set parameter in association with the pixel data (the processed pixel data) by including the set parameter in additional information such as so-called header information or marker information added to a beginning or an end of the pixel data (the processed pixel data) to be output to the external image processing device 600. Also, in the present invention, a method of associating set parameters when the external input/output module 42 outputs pixel data (processed pixel data) to the external image processing device 600 is not particularly limited.

Also, similar to the external input/output module 22 in the first embodiment, the external input/output module 42 outputs pixel data subjected to external image processing directly input from the connected external image processing device 600 without involving the data bus 10 to the image processing module 21 connected to the subsequent stage, for example, in accordance with control from the control section (not shown). Also, similar to the external input/output module 22 in the first embodiment, the external input/output module 42 includes a data buffer configured to temporarily store pixel data for a predetermined number of unit lines. In FIG. 9, similar to the external input/output module 22 in the first embodiment shown in FIG. 1, the external input/output module 42 having the margin storage buffer 22222 configured as a data buffer and a part of a data buffer is shown.

In this manner, in the image processing section 40, as in the image processing section 20 provided in the image processing device 1 according to the first embodiment, each image processing module 21 also performs a series of pipeline processing on still-image data of one frame by sequentially performing image processing on pixel data included in block image data for each unit line in accordance with control from the control section (not shown). Also, in the image processing section 40, as in the image processing section 20 provided in the image processing device 1 according to the first embodiment, the pipeline processing is incorporated by causing a component provided outside the image processing section 40 (the external image processing device 600 in FIG. 9) to execute external image processing which is not executed in any image processing modules 21, for example, in accordance with the control from the control section (not shown). At this time, in the image processing section 40, as in the image processing section 20 provided in the image processing device 1 according to the first embodiment, the external input/output module 42 is also incorporated into a pipeline configuration as an image processing module for executing external image processing.

According to such a configuration, in the image processing device 2, as in the image processing device 1 according to the first embodiment, it is also possible to extend the pipeline processing in the image processing section 40 by performing image processing which cannot be executed by the image processing section 40 as in a manner in which the image processing section 40 performs pipeline processing. Thereby, in the imaging device 200, as in the imaging device 100 according to the first embodiment, it is also possible to extend image processing as in a manner in which the image processing section 40 provided in the image processing device 2 performs the pipeline processing by incorporating external image processing to be executed by the external image processing device 600 into the pipeline processing based on image processing to be executed by each of the image processing modules 21 within the image processing section 40 provided in the image processing device 2.

Also, the operation of the image processing module 21 provided in the image processing section 40 in the image processing device 2 is similar to the operation of the image processing module 21 provided in the image processing section 20 in the image processing device 1 according to the first embodiment. Accordingly, a detailed description related to the operation of the image processing module 21 provided in the image processing section 40 in the image processing device 2 will be omitted.

Next, the configuration and operation of the external input/output module 42 provided in the image processing section 40 in the image processing device 2 will be described. The basic configuration of the external input/output module 42 is similar to the basic configuration of the external input/output module 22 provided within the image processing section 20 of the image processing device 1 in the image processing device 1 according to the first embodiment shown in FIG. 5. Accordingly, a detailed description related to the basic configuration of the external input/output module 42 and the concept of the operation of exchanging processed pixel data between the external input/output module 42 and the external image processing device 600 will be omitted.

Figure 10:
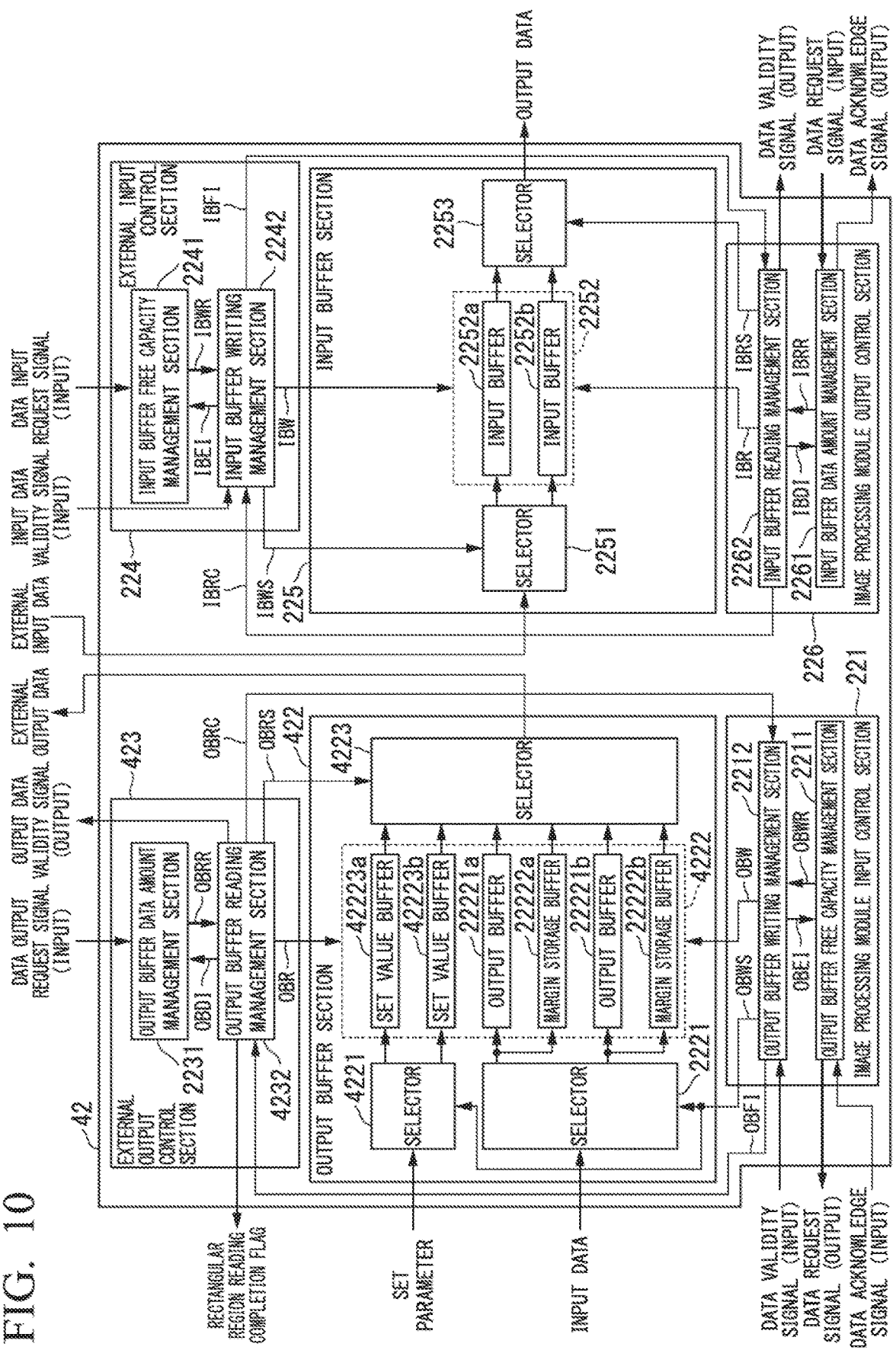
FIG. 10 is a block diagram showing a configuration of an external input/output module provided in an image processing section within the image processing device according to the second embodiment of the present invention.

FIG. 10 is a block diagram showing a configuration of the external input/output module 42 provided in the image processing section 40 within the image processing device 2 according to the second embodiment of the present invention. In FIG. 10, a basic configuration of the external input/output module 42 is shown. The external input/output module 42 shown in FIG. 10 includes an image processing module input control section 221, an output buffer section 422, an external output control section 423, an external input control section 224, an input buffer section 225, an image processing module output control section 226. The external input/output module 42 shown in FIG. 10 has a configuration in which the output buffer section 222 provided in the external input/output module 22 of the image processing section 20 provided in the image processing device 1 according to the first embodiment is replaced with the output buffer section 422, and the external output control section 223 is replaced with the external output control section 423. As described above, the external input/output module 42 has functions corresponding to set parameters to be set by the parameter setting section 41 added to a function of the external input/output module 22 of the image processing section 20 provided in the image processing device 1 according to the first embodiment.

Also, the other components of the external input/output module 42 are similar to those of the external input/output module 22 of the image processing section 20 provided in the image processing device 1 according to the first embodiment shown in FIG. 8. Accordingly, in the following description, the components provided in the external input/output module 42 similar to those of the external input/output module 22 according to the first embodiment shown in FIG. 8 are denoted by the same reference signs and a detailed description related to the components will be omitted.

Also, in the external input/output module 42, the configuration of the image processing module input control section 221, the output buffer section 422, and the external output control section 423 is an external output section. Also, in the external input/output module 42, as in the external input/output module 22, according to the configuration of the external output section, the input data (processed pixel data)

output from the image processing module 21 connected to the previous stage is temporarily stored in the output buffer section 422 and the processed pixel data temporarily stored in the output buffer section 422 is read and output as external output data in accordance with an output data request from the connected external image processing device 600. Also, in the external input/output module 42, the configuration of the external input section is similar to that of the external input/output module 22. In other words, in the external input/output module 42, the configuration of the external input control section 224, the input buffer section 225, and the image processing module output control section 226 is an external input section.

Similar to the output buffer section 222 provided in the external input/output module 22 according to the first embodiment, the output buffer section 422 is a data buffer configured to temporarily store input data (processed pixel data) input to the external input/output module 42. The output buffer section 422 shown in FIG. 10 includes a selector 2221, a selector 4221, a data buffer section 4222, and a selector 4223. Also, the data buffer section 4222 includes two sets of data buffers including a set of data buffers including an output buffer 22221a, a margin storage buffer 22222a, and a set value buffer 42223a and a set of data buffers including an output buffer 22221b, a margin storage buffer 22222b, and a set value buffer 42223b. The output buffer section 422 has a configuration in which the data buffer section 2222 provided in the output buffer section 222 within the external input/output module 22 of the image processing section 20 provided in the image processing device 1 according to the first embodiment is replaced with the data buffer section 4222, the selector 2223 is replaced with the selector 4223, and the selector 4221 is added. Also, the data buffer section 4222 has a configuration in which the set value buffer 42223a and the set value buffer 42223b are added to the data buffer section 2222 provided in the output buffer section 222 within the external input/output module 22 of the image processing section 20 provided in the image processing device 1 according to the first embodiment. Similar to the data buffer section 2222 provided in the output buffer section 222 within the external input/output module 22 according to the first embodiment, the data buffer section 4222 also has a double buffer configuration including two data buffers for alternately performing switching between the storage (writing) and output (reading) of the processed pixel data in opposite operations in each set of data buffers.

Also, the other components in the output buffer section 422 are similar to the components in the output buffer section 222 within the external input/output module 22 in the first embodiment shown in FIG. 8. Accordingly, in the following explanation, the components provided in the output buffer section 422 similar to those of the output buffer section 222 are denoted by the same reference signs and a detailed description related to the components will be omitted.

The selector 4221 is a selection section configured to select a set of data buffers in which the set parameters output from the parameter setting section 41 are written in the output buffer section 422. In accordance with an output buffer writing selection signal OBWS output from the image processing module input control section 221, the selector 4221 selects a data buffer of either the set value buffer 42223a or the set value buffer 42223b belonging to the same set of data buffers as a set of data buffers in which the processed pixel data selected by the selector 2221 is written as a data buffer in which a set parameter is written. Then, the selector 4221 outputs the set parameter input to the external input/output module 42 to a data buffer of the selected set value buffer 42223a or 42223b. In the following description, a set of data buffers including the output buffer 22221a, the margin storage buffer 22222a, and the set value buffer 42223a is referred to as a "data buffer set a" and a set of data buffers including the output buffer 22221b, the margin storage buffer 22222b, and the set value buffer 42223b is referred to as a "data buffer set b".

The selector 4223 is a selection section configured to select a set of data buffers from which the processed pixel data and the set parameters stored in the output buffer section 422 are read. In accordance with the output buffer reading selection signal OBRS output from the external output control section 423, the selector 4223 selects a set of data buffers of either the data buffer set a or the data buffer set b as a set of data buffers from which the stored processed pixel data and set parameters are read. Then, the selector 4223 associates the processed pixel data read from the set of data buffers of the selected data buffer set a or b with a set parameter read in the same manner and outputs the processed pixel data associated with the set parameter as external output data associated with the set parameter to the external image processing device 600. Thereby, external output data (processed pixel data) associated with set parameters is output to the external image processing device 600 and the external image processing device 600 performs external image processing on block image data included in each rectangular region on the basis of the set parameters associated with the external output data (the processed pixel data).

Each of the set value buffer 42223a and the set value buffer 42223b is a data buffer with a storage capacity configured to temporarily store the set parameters output from the parameter setting section 41. In the data buffer of either the set value buffer 42223a or the set value buffer 42223b selected as the data buffer in which the set parameter is written by the selector 4221 is selected, the set parameter input via the selector 4221 is written (stored) in accordance with an output buffer writing signal OBW output from the image processing module input control section 221. On the other hand, in the data buffer of either the set value buffer 42223a or the set value buffer 42223b selected as the data buffer for reading the set parameter stored by the selector 4223, the stored set parameter is read and output to the selector 4223 in accordance with an output buffer reading signal OBR output from the external output control section 423.

Also, similar to the margin storage buffer 22222a or the margin storage buffer 22222b, each of the set value buffer 42223a and the set value buffer 42223b may be configured to have the storage capacity of the corresponding output buffer 22221a or 22221b. In other words, the storage capacity of the output buffer section 222 may include the storage capacity corresponding to the margin storage buffer 22222 or the set value buffer 42223.

Similar to the external output control section 223 provided in the external input/output module 22 in the first embodiment, the external output control section 423 controls the output (reading) of the input data (processed pixel data) stored in the output buffer section 422. The external output control section 423 shown in FIG. 10 includes an output buffer data amount management section 2231 and an output buffer reading management section 4232. The external output control section 423 has a configuration in which the output buffer reading management section 2232 within the external output control section 223 provided in the external input/output module 22 according to the first embodiment is replaced with the output buffer reading management section 4232.

The other components of the external output control section 423 are similar to those of the external output control section 223 within the external input/output module 22 according to the first embodiment shown in FIG. 8. Accordingly, in the following explanation, the components provided in the external output control section 423 similar to those of the external output control section 223 are denoted by the same reference signs and a detailed description related to the components will be omitted.

Similar to the output buffer reading management section 2232 provided in the external output control section 223 within the external input/output module 22 according to the first embodiment, the output buffer reading management section 4232 outputs output buffer data amount information OBDI indicating a result of monitoring the amount of data written in the output buffer section 422 to the output buffer data amount management section 2231 on the basis of output buffer flag information OBFI output from the image processing module input control section 221. Also, similar to the output buffer reading management section 2232 according to the first embodiment, the output buffer reading management section 4232 outputs an output buffer reading selection signal OBRS and an output buffer reading signal OBR for controlling the reading (output) of input data (processed pixel data) stored in the output buffer section 422 to the output buffer section 422 on the basis of an output buffer reading reservation signal OBRR output from the output buffer data amount management section 2231. Thereby, in accordance with the output buffer reading signal OBR, the output buffer section 422 reads stored processed pixel data (including processed pixel data of a rectangular region) of a requested amount of data and the set parameter in accordance with the output buffer reading signal OBR, and outputs the processed pixel data and the set parameter as the external output data associated with the set parameter to the external image processing device 600. At this time, similar to the output buffer reading management section 2232 according to the first embodiment, the output buffer reading management section 4232 outputs an output data validity signal to the external image processing device 600. Also, similar to the output buffer reading management section 2232 according to the first embodiment, the output buffer reading management section 4232 outputs an output buffer reading completion signal OBRC to the image processing module input control section 221 when the reading of the processed pixel data of the amount of data requested from the external image processing device 600 is completed.

Also, when the reading (output) of the input data (processed pixel data) corresponding to one rectangular region stored in the output buffer section 422 is completed in the output buffer reading management section 4232, a rectangular region reading completion flag indicating that the reading of the rectangular region is completed is output to the parameter setting section 41. Thereby, the parameter setting section 41 outputs the set parameter corresponding to the rectangular region to be subjected to next external image processing by the external image processing device 600 to the external input/output module 42. Then, the external input/output module 42 writes (stores) the set parameter output from the parameter setting section 41 in a data buffer of either the set value buffer 42223*a* or the set value buffer 42223*b* selected by the selector 4221.

According to such a configuration, similar to the external output section of the external input/output module 22 according to the first embodiment, the external output section of the external input/output module 42 divides the input data (the processed pixel data) output from the image processing module 21 connected to the previous stage into processed pixel data other than that of the margin region and the processed pixel data of the margin region and temporarily stores the divided input data in a set of data buffers. At this time, in the external output section of the external input/output module 42, the set parameter corresponding to each rectangular region output from the parameter setting section 41 is temporarily stored in the set of data buffers corresponding to the processed pixel data. Similar to the external output section of the external input/output module 22 according to the first embodiment, the external output section of the external input/output module 42 reads processed pixel data of the margin region and processed pixel data other than that of the margin region stored in a set of data buffer in response to a data output request from the external image processing device 600. At this time, in the external output section of the external input/output module 42, the set parameters corresponding to the read processed pixel data of the margin region and the read processed pixel data other than that of the margin region are also read from the set of data buffers and output data are output to the external image processing device 600 as external output data associated with the set parameters in association with the processed pixel data of the margin region and the processed pixel data other than that of the margin region read from the set of data buffers.

Also, the configuration of the external input section of the external input/output module 42 is similar to that of the external input/output module 22 according to the first embodiment as described above. Accordingly, a detailed description related to the external input section of the external input/output module 42 will be omitted.

According to such a configuration, the external input/output module 42 provided in the image processing section 40 outputs input data (processed pixel data) output from the image processing module 21 connected to the previous stage to the connected external image processing device 600 and the set parameters output from the parameter setting section 41 and outputs the external input data (the externally processed pixel data) output from the external image processing device 600 to the image processing module 21 connected to the subsequent stage. Thereby, the external input/output module 42 can incorporate external image processing of the connected external image processing device 600 between the image processing module 21 connected to the previous stage and the image processing module 21 connected to the subsequent stage in the pipeline configured in the image processing section 40. Thereby, in the image processing device 2, it is possible to execute a series of image processing in which external image processing of the external image processing device 600 is incorporated into the pipeline processing configured in the image processing section 40 even when it is necessary to set a set parameter differing by each rectangular region. In the image processing device 2, as in the image processing device 1 according to the first embodiment, it is possible to reduce power consumption of the image processing device 2 by avoiding overload on the bus bandwidth of the data bus 10 when image processing is performed.

Also, although pixel data is exchanged according to a request signal, an acknowledge signal, and a valid signal in the configuration of the external input/output module 42 shown in FIG. 10 as in the external input/output module 22 according to the first embodiment shown in FIG. 8, the external input/output module 42 may exchange pixel data according to other various data transmission methods.

Also, according to the present second embodiment, in the image processing device (the image processing device 2, the output buffer section (the output buffer section 422) further includes a set value buffer (the set value buffer 42223, for example, the set value buffer 42223*a* or the set value buffer 42223*b*) configured to temporarily store a set value (a set parameter) when the processing is performed on the image data (pixel data) included in the block (the rectangular region, for example, the rectangular regions R1 to R25), wherein the processing module input control section (the image processing module input control section 221) is configured to cause a corresponding set parameter to be written in the set value buffer (for example, the set value buffer 42223*a* or the set value buffer 42223*b*) for each rectangular region on which the first processing module (for example, the image processing module 21-2) has performed the processing, and the external output control section (the external output control section 423) is configured to cause the set parameter associated with the processed data (the input data, the pixel data, or the processed pixel data) read from the margin storage buffer (for example, the margin storage buffer 22222*a* or the margin storage buffer 22222*b*) and the output buffer (for example, the output buffer 22221*b* or the output buffer 22221*a*) to be read from the set value buffer (for example, the set value buffer 42223*a* or the set value buffer 42223*b*) in response to a request from the external processing section (the external image processing device 600).

Also, according to the present second embodiment, in the image processing device 2, the image processing section (the image processing section 40) further includes a setting section (the parameter setting section 41) configured to set the set parameter corresponding to the rectangular region, the external output control section 423 is configured to output a reading completion signal (the rectangular region reading completion flag) indicating that reading from the margin storage buffer (for example, the margin storage buffer 22222*a* or the margin storage buffer 22222*b*) and the output buffer (for example, the output buffer 22221*b* or the output buffer 22221*a*) of the processed data (the input data, the pixel data, or the processed pixel data) corresponding to the rectangular region and reading from the set value buffer (for example, the set value buffer 42223*b* or the set value buffer 42223*a*) of the set parameter are completed to the parameter setting section 41, and the parameter setting section 41 is configured to output the set parameter associated with the processed data (the input data, the pixel data, or the processed pixel data) subsequently read from the margin storage buffer (for example, the margin storage buffer 22222*b* or the margin storage buffer 22222*a*) and the output buffer (for example, the output buffer 22221*a* or the output buffer 22221*b*) in accordance with the reading completion signal (the rectangular region reading completion flag).

Also, according to the present second embodiment, in the image processing device 2, the set parameter is a value differing by each rectangular region.

As described above, in the image processing device 2 according to the second embodiment, as in the image processing device 1 according to the first embodiment, it is possible to incorporate image processing of the external image processing device 600 connected outside the image processing section 40 for providing extensibility into the image processing based on pipeline processing without interrupting the pipeline processing which has already been configured by the external input/output module 42. Thereby, in the image processing device 2 according to the second embodiment, as in the image processing device 1 according to the first embodiment, it is also possible to extend image processing without causing overload on the bus bandwidth of the data bus 10 to which the frame memory 500 is connected or an increase in power consumption of the image processing device 2 and without degrading the performance of the imaging device 200 equipped with the image processing device 2 according to the second embodiment.

Also, the configuration in which the parameter setting section 41 provided in the image processing section 40 sets the set parameter corresponding to each rectangular region in the image processing device 2 according to the second embodiment has been described. However, the component for setting the set parameter is not limited to the parameter setting section 41. For example, a configuration in which a system control section (not shown) for controlling components provided in the image processing device 2 or the external image processing device 600 and a control section (not shown) provided in the image processing device 2 sets a set parameter corresponding to a rectangular region may be adopted.

Also, a configuration in which external image processing of the external image processing device 600 is incorporated between the image processing module 21-2 and the image processing module 21-3 provided in the image processing section 40 within the image processing device 2 in the image processing device 2 according to the second embodiment, has been described. However, an order of image processing to be performed by the image processing section 40 and a concept of changing a position of external image processing to be incorporated into the pipeline in the image processing device 2 according to the second embodiment are also similar to those of the image processing device 1 according to the first embodiment. Also, in the image processing device 2 according to the second embodiment, the component (the processing device) connected to the external input/output module 42 provided in the image processing section 40 and configured to extend the image processing is similar to that of the image processing device 1 according to the first embodiment and the present invention is not limited to the component outside the image processing device 2.

Also, a configuration in which one external input/output module 22 is provided in the image processing section 20 in the image processing device 1 according to the first embodiment and one external input/output module 42 is provided in the image processing section 40 in the image processing device 2 according to the second embodiment has been described. However, in the image processing device according to the present invention, the number of external input/output modules provided in the image processing section is not limited to the number described in the first embodiment and the second embodiment, i.e., the number of external input/output modules is not limited to one. That is, in the image processing device according to the present invention, a plurality of external input/output modules may be provided in the image processing section. By providing a plurality of external input/output modules in the image processing section, image processing to be executed by a component provided outside the image processing section can be incorporated at a plurality of positions within the pipeline already configured in the image processing section.

Also, in the first embodiment and the second embodiment, a case in which the image processing module 21 provided in the image processing section 20 and the image processing section 40 includes the margin storage buffer 212 has been described. However, the configurations of the image processing modules 21 provided in the image processing section 20 and the image processing section 40 are not limited to the configurations shown in the first embodiment and the second embodiment. In other words, the image processing modules 21 provided in the image processing section 20 and the image processing section 40 may be configured without including the margin storage buffer 212. At this time, some image processing module 21 provided in the image processing section 20 and the image processing section 40 may be configured without including the margin storage buffer 212.

In the first embodiment and the second embodiment, a configuration in which subsequent image processing in the pipeline processing is performed in the image processing section after the processed pixel data obtained by partially executing the pipeline processing in the image processing section is temporarily output outside the image processing section and externally processed pixel data obtained by performing image processing outside the image processing section is input has been described. However, in the image processing section provided in the image processing device, a configuration in which pipeline processing is executed from the middle or a configuration in which pipeline processing is executed until the middle may be conceived. That is, a configuration in which processed pixel data obtained by executing pipeline processing in the image processing section is only output outside the image processing section in the image processing device or in which externally processed pixel data obtained by performing external image processing in a component outside the image processing device (or the image processing section) is only input to the image processing device may also be conceived. In this case, in the external input/output module provided in the image processing section, it is possible to implement a configuration in which only the output of the processed pixel data to the external component or only the input of the externally processed pixel data from the external component is performed by operating a component related to the output of the processed pixel data to the outside of the image processing section or a component related to the input of the externally processed pixel data from the outside of the image processing section. That is, a configuration in which only the output of the processed pixel data to the external component is performed by operating only the external output section or only the input of the externally processed pixel data from the external component is performed by operating only the external input section may be adopted in the external input/output module. Thereby, in the first embodiment and the second embodiment, it is possible to incorporate image processing of the external component (the external image processing device 600) which was not considered at the time of development of the image processing device into the image processing based on the already configured pipeline processing in the image processing device.

Also, in the first embodiment and the second embodiment, a configuration in which the external input/output module is incorporated into the already configured pipeline by each image processing module provided in the image processing section has been described. However, in the image processing section provided in the image processing device, a configuration in which only the external input/output module is operated, i.e., only a component outside the image processing device (the external image processing device 600) executes the pipeline processing, may also be conceived. In this case, in the image processing device, the external input/output module reads the pixel data from the frame memory, temporarily outputs the pixel data outside the image processing section, and stores the externally processed pixel data subjected to the image processing outside the image processing section in the frame memory. Thereby, in the first embodiment and the second embodiment, it is possible to perform image processing of an external component (the external image processing device 600) instead of image processing based on pipeline processing already configured in the image processing device as image processing in the image processing device.

According to the present first embodiment and the present second embodiment, there is provided an image processing device (the image processing device 1 or the image processing device 2) in which an image processing section (the image processing section 20 or the image processing section 40) for configuring a pipeline by connecting a plurality of processing modules (the image processing modules 21-1 to 21-4) for performing predetermined processing on input image data (still-image data) in series and performing pipeline processing in which each of the image processing modules 21-1 to 21-4 sequentially performs the processing is connected to a data bus (the data bus 10) and performs image processing by dividing a region of the still-image data of one frame into a plurality of blocks (rectangular regions, for example, the rectangular regions R1 to R25) each having a predetermined size and reading the image data (block image data) included in the rectangular region from a data storage section (the frame memory 500) connected to the data bus 10 via the data bus 10 for each rectangular region, wherein the image processing section 20 or the image processing section 40 includes an external input/output module (the external input/output module 22 or the external input/output module 42) incorporated into the pipeline as the processing module configured to perform processing different from the processing to be performed by each of the image processing modules 21-1 to 21-4, and wherein the external input/output module 22 or the external input/output module 42 is configured to directly output processed data (the input data, the pixel data, or the processed pixel data) obtained by performing the processing on the image data (the pixel data) included in the rectangular region in a first processing module (for example, the image processing module 21-2) which is the processing module located at a stage previous to a position where the external input/output module 22 or the external input/output module 42 is incorporated into the pipeline to an external processing section (the external image processing device 600) outside the image processing section 20 or the image processing section 40 without involving the data bus 10, directly outputs externally processed data (external input data or externally processed pixel data) input from the external image processing device 600 outside the image processing section 20 or the image processing section 40 to a second processing module (for example, the image processing module 21-3) which is the processing module located at a stage subsequent to the position where the external input/output module 22 or the external input/output module 42 is incorporated into the pipeline without involving the data bus 10, or performs both a direct output of the processed data (the input data, the pixel data, or the processed pixel data) to the external image processing device 600 outside the image processing section 20 or the image processing section 40 without involving the data bus 10 and a direct output of the externally processed data (the external input data or the externally processed pixel data) input by the external image processing device 600 performing the external processing (external image processing) on the processed data (the input data, the pixel data, or the processed pixel data) to the second image processing module 21-2 (for example, the image processing module 21-3) without involving the data bus 10.

Also, although each of the image processing modules 21-1 to 21-4 performs pipeline processing for image processing at a timing of a clock signal within the image processing section or the image processing device in the first embodiment and the second embodiment, a timing at which the external image processing device 600 performs the image processing is not necessarily the timing of the clock signal in the image processing section or the image processing device. In other words, the processing rate when the external image processing device 600 performs image processing is not necessarily similar to the processing rate in each of the image processing modules 21-1 to 21-4. Also, in the first embodiment and the second embodiment, for example, even when a processing device such as a CPU or a DSP for performing software processing or processing one pixel with a plurality of clocks is used as the external image processing device 600, the processing rate when image processing is performed is not necessarily similar to the processing rate in each of the image processing modules 21-1 to 21-4. That is, as in the case in which the processing rate in each of the image processing modules 21-1 to 21-4 is high and the processing rate in the external image processing device 600 is low, the processing rate is different between the image processing device and the external image processing device 600. Also, for example, if the external image processing device 600 includes a storage device capable of temporarily storing much processed pixel data, the processing rate may be different between the image processing device and the external image processing device 600 when the external image processing device 600 performs image processing on temporarily stored processed pixel data after a predetermined amount of processed pixel data is temporarily stored in the storage device. As described above, even when the processing rate is different between the image processing device and the external image processing device 600, each image processing module 21 and the external input/output module 22 (the external image processing device 600) can perform image processing on each rectangular region in parallel at the same time in the first embodiment and the second embodiment.

As described above, according to the embodiments of the present invention, the image processing section provided in the image processing device includes a component provided outside the image processing section and an external input/output module configured to directly establish a connection without involving the data bus. That is, in each embodiment of the present invention, in order to extend the image processing executed in the image processing section, there are provided an image processing device configured to perform image processing that is not executed by any image processing module provided in the image processing section and an external input/output module configured to directly establish a connection without involving the data bus. Thereby, in each embodiment of the present invention, it is possible to incorporate image processing to be executed by a component provided outside the image processing section connected to the external input/output module as the image processing to be executed by the image processing module into a series of pipeline processing to be executed by each image processing module provided in the image processing section without interrupting the already configured pipeline processing by each image processing module provided in the image processing section. Thereby, in each embodiment of the present invention, as in a case in which each image processing module provided in the image processing section is performing pipeline processing, it is possible to extend a series of image processing based on pipeline processing of the image processing section.

Moreover, in each embodiment of the present invention, the external input/output module provided in the image processing device includes a margin storage buffer configured to store pixel data included in a margin region overlapping between adjacent rectangular regions when still-image data of one frame to be subjected to image processing is divided into a plurality of rectangular regions each having a predetermined size and image processing is performed for each rectangular region. Thereby, in each embodiment of the present invention, even when image processing is performed for each rectangular region obtained through division in a component provided outside the image processing section connected to the external input/output module, it is possible to perform image processing to be extended by a component provided outside the image processing section in a state in which the margin region is included therein without having to re-read image data stored in the margin storage buffer which is necessary when image processing is performed on the next margin region. Thereby, in each embodiment of the present invention, it is possible to extend image processing without causing overload on the bus bandwidth of the data bus or an increase in power consumption of the image processing device and without degrading the performance of the imaging device equipped with the image processing device. For example, it is possible to implement an imaging device configured to perform basic image processing by mounting the image processing device 1 according to the first embodiment and implement an imaging device configured to perform high-performance image processing by mounting both the image processing device 1 and the external image processing device 600.

Also, in each embodiment of the present invention, the configuration in which each processing module constituting the pipeline is provided in the image processing section provided in the image processing device has been described. However, in addition to the image processing device, various processing devices are conceivable as the processing device for performing a series of processing according to the pipeline configuration. In addition to imaging devices, various systems are also conceivable as systems requiring the extension of a series of processing according to pipeline configuration. Accordingly, a processing device and a system to which the concept of the present invention can be applied are not limited to the image processing device and the imaging device described in each embodiment of the present invention. The concept of the present invention can be similarly applied to any system equipped with a processing device for performing pipeline processing by connecting a plurality of processing modules in series to configure a pipeline. In this case, it is possible to obtain effects similar to those of the present invention.

While preferred embodiments of the present invention have been described and shown above, the present invention is not limited to the embodiments and modified examples thereof. Within a range not departing from the gist or spirit of the present invention, additions, omissions, substitutions, and other modifications to the configuration can be made.

Also, the present invention is not to be considered as being limited by the foregoing description, and is limited only by the scope of the appended claims.

What is claimed is:

1. An image processing device in which an image processing section including a plurality of processing modules for performing predetermined processing on input image data and a data storage section for store the image data are connected to a data bus,
> wherein the image processing section is configured as a pipeline by connecting the plurality of processing modules in series, and performing pipeline processing in which each processing module sequentially performs the processing,
> the image processing section includes an external input/output module incorporated into the pipeline as the processing module configured to perform processing different from the processing to be performed by each of the processing modules,
> the image processing section performs image processing by dividing a region of the image data of one frame into a plurality of blocks each having a predetermined size and reading the image data included in the block from a data storage section via the data bus for each block,
> the external input/output module is configured to directly output processed data input by a first processing module to an external processing section outside the image processing section without involving the data bus, and directly output externally processed data input by the external processing section to a second processing module without involving the data bus,
> the first processing module being the processing module located at a stage previous to a position where the external input/output module is incorporated into the pipeline,
> the second processing module being the processing module located at a stage subsequent to the first processing module in the pipeline,
> the processed data being the data obtained by performing the processing on the image data included in the block by the first processing module,
> the externally processed data being the data performed external processing on the processed data by the external processing section.

2. The image processing device according to claim 1,
> wherein the external input/output module is configured to directly output externally processed data to a second processing module without involving the data bus, or performs both a direct output of the processed data to the external processing section without involving the data bus and a direct output of the externally processed data to the second processing module without involving the data bus,
> the second processing module being the processing module located at a stage subsequent to the position where the external input/output module is incorporated into the pipeline.

3. The image processing device according to claim 1,
> wherein the external input/output module includes
>> an output buffer section configured to temporarily store the processed data; and
>> an input buffer section configured to temporarily store the externally processed data,
>
> wherein the external input/output module is configured to temporarily store the processed data output by the first processing module in the output buffer section, and output the processed data stored in the output buffer section in response to a request from the external processing section, and
> wherein the external input/output module is configured to temporarily store the externally processed data output by the external processing section in the input buffer section, and output the externally processed data stored in the input buffer section in response to a request from the second processing module.

4. The image processing device according to claim 3,
> wherein the external input/output module further includes
>> a processing module input control section configured to control writing of the processed data in the output buffer section on the basis of a storage capacity of the output buffer section;
>> an external output control section configured to control reading of the processed data from the output buffer section on the basis of an amount of the processed data stored in the output buffer section;
>> an external input control section configured to control writing of the externally processed data in the input buffer section on the basis of a storage capacity of the input buffer section; and
>> a processing module output control section configured to control reading of the externally processed data from the input buffer section on the basis of an amount of the externally processed data stored in the input buffer section.

5. The image processing device according to claim 4,
> wherein the processing module input control section is configured to cause the processed data to be written in the output buffer section for each block for performing the processing in the first processing module,
> the external output control section is configured to cause the processed data stored in the output buffer section to be read for each unit for performing the external processing in the external processing section,
> the external input control section is configured to cause the externally processed data to be written in the input buffer section for each unit for performing the external processing in the external processing section, and
> the processing module output control section is configured to cause the externally processed data stored in the input buffer section to be read for each block for performing the processing in the second processing module.

6. The image processing device according to claim 5,
> wherein the output buffer section includes
>> a margin storage buffer configured to temporarily store the processed data of a margin region where the block to be processed overlaps the block adjacent to a rear side in a direction of advance when the pipeline processing is performed within the processed data output by the first processing module; and
>> an output buffer configured to temporarily store the processed data outside the margin region,
>
> wherein the processing module input control section is configured to cause the processed data outside the margin region to be written in the output buffer and cause the processed data of the margin region to be written in the margin storage buffer for each block for which the first processing module has performed the processing, and
> the external output control section is configured to cause the processed data stored in the output buffer to be read after causing the processed data stored in the margin storage buffer to be read in accordance with a request from the external processing section.

7. The image processing device according to claim 6,
> wherein the output buffer section further includes a set value buffer configured to temporarily store a set value when the processing is performed on the image data included in the block, the processing module input control section is configured to cause a corresponding set value to be written in the set value buffer for each block for which the first processing module has performed the processing, and the external output control section is configured to cause the set value associated with the processed data read from the margin storage buffer and the output buffer to be read from the set value buffer in response to a request from the external processing section.

8. The image processing device according to claim 7, wherein the image processing section further includes a setting section configured to set the set value corresponding to the block, the external output control section is configured to output a reading completion signal to the setting section, and wherein the setting section is configured to output the set value associated with the processed data subsequently read from the margin storage buffer and the output buffer in accordance with the reading completion signal, the reading completion signal being indicating that reading from the margin storage buffer and the output buffer of the processed data corresponding to the block and reading from the set value buffer of the set value are completed.

9. The image processing device according to claim 8, wherein the set value is a value differing by each block.

10. The image processing device according to claim 5, wherein a storage capacity of the output buffer section and a storage capacity of the input buffer section are less than a storage capacity for storing all pixel data included in the image data of one frame.

11. The image processing device according to claim 2, wherein the external input/output module includes an output buffer section configured to temporarily store the processed data; and an input buffer section configured to temporarily store the externally processed data, wherein the external input/output module is configured to temporarily store the processed data output by the first processing module in the output buffer section, and output the processed data stored in the output buffer section in response to a request from the external processing section, and wherein the external input/output module is configured to temporarily store the externally processed data output by the external processing section in the input buffer section, and output the externally processed data stored in the input buffer section in response to a request from the second processing module.

* * * * *